(12) United States Patent
Li et al.

(10) Patent No.: US 11,445,536 B2
(45) Date of Patent: Sep. 13, 2022

(54) DOWNLINK CONTROL INFORMATION TRANSMISSION METHOD

(71) Applicant: Huawei Technologies Co., Ltd., Shenzhen (CN)

(72) Inventors: Junchao Li, Shanghai (CN); Hao Tang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 16/890,006

(22) Filed: Jun. 2, 2020

(65) Prior Publication Data

US 2020/0296758 A1 Sep. 17, 2020

Related U.S. Application Data

(63) Continuation of application No. PCT/CN2019/074555, filed on Feb. 2, 2019.

(30) Foreign Application Priority Data

Feb. 14, 2018 (CN) .......................... 201810152331.5

(51) Int. Cl.
*H04W 72/12* (2009.01)
*H04L 5/00* (2006.01)

(52) U.S. Cl.
CPC ......... *H04W 72/1289* (2013.01); *H04L 5/001* (2013.01)

(58) Field of Classification Search
CPC ............................ H04L 5/001; H04W 72/1289
(Continued)

(56) References Cited

U.S. PATENT DOCUMENTS

2017/0359791 A1 12/2017 Onggosanusi et al.
2019/0349180 A1* 11/2019 Lu ..................... H04W 72/0446
(Continued)

FOREIGN PATENT DOCUMENTS

| CN | 102595385 A | 7/2012 |
|---|---|---|
| CN | 107547187 A | 1/2018 |

(Continued)

OTHER PUBLICATIONS

Huawei et al,"Bandwidth part activation and adaptation", 3GPP TSG RAN WG1 Meeting NR Ad Hoc#3, R1-1715571, Nagoya, Japan, Sep. 18-21, 2017, total 5 pages.
(Continued)

*Primary Examiner* — Peter G Solinsky
(74) *Attorney, Agent, or Firm* — Slater Matsil, LLP

(57) ABSTRACT

An embodiment of this application provides a downlink control information transmission method and an apparatus. The method includes: receiving first downlink control information DCI in search space of a first carrier bandwidth part BWP, where if a frequency domain resource allocation type of the first BWP is a type 0, an $L_f$-bit frequency domain resource allocation indication in the first DCI is an $L_f$-bit bitmap, and bits in the $L_f$-bit bitmap in descending order are respectively corresponding to resource block groups RBG 0 to RBG ($L_f$-1) in a second BWP; and for one bit in the $L_f$-bit bitmap, when a value of the bit is t1, an allocated resource includes one RBG corresponding to the bit.

19 Claims, 4 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2019/0357262 | A1* | 11/2019 | Cirik | H04W 76/27 |
| 2020/0092861 | A1* | 3/2020 | Xu | H04L 5/0082 |
| 2020/0092913 | A1* | 3/2020 | Xu | H04W 74/0816 |
| 2020/0107319 | A1* | 4/2020 | Bagheri | H04W 24/10 |
| 2020/0107369 | A1* | 4/2020 | Jeon | H04W 74/0833 |
| 2020/0221506 | A1* | 7/2020 | Jeon | H04W 74/0833 |
| 2020/0228251 | A1* | 7/2020 | Yeo | H04L 1/1854 |
| 2020/0245304 | A1* | 7/2020 | Nam | H04L 5/0078 |
| 2021/0007139 | A1* | 1/2021 | Fu | H04L 5/0053 |
| 2021/0195523 | A1* | 6/2021 | Kim | H04W 52/0241 |
| 2021/0250914 | A1* | 8/2021 | Song | H04L 5/0092 |
| 2021/0321414 | A1* | 10/2021 | Yeo | H04L 1/0004 |

FOREIGN PATENT DOCUMENTS

| | | | | |
|---|---|---|---|---|
| EP | 3780797 A1 | * | 2/2021 | ........ H04W 72/0453 |
| WO | 2015169037 A1 | | 11/2015 | |

OTHER PUBLICATIONS

Catt ,"On PDSCH and PUSCH resource allocation",3GPP TSG RAN WG1 Meeting AH 1801, R1-1800257, Vancouver, Canada, Jan. 22-26, 2018, total 23 pages.

Qualcomm Incorporated: "Remaining Issues on BWP", 3GPP TSG RAN WG1 Meeting AH 1801, R1-1800879, Vancouver, Canada, Jan. 22-26, 2018, 13 pages.

"3rd Generation Partnership Project; Technical Specification Group Radio Access Network; NR; Physical channels and modulation (Release 15)", 3GPP TS 38.211 V15.0.0 (Dec. 2017); 73 pages.

Nokia et al., "On remaining aspects of BWPs", 3GPP TSG-RAN WG1 Meeting #91, R1-1720511, Reno, Nevada, Nov. 27-Dec. 1, 2017, 5 pages.

"3rd Generation Partnership Project; Technical Specification Group Radio Access Network; NR; Physical layer procedures for control (Release 15)", 3GPP TS 38.213 V15.0.0 (Dec. 2017); 56 pages.

Catt,"Remaining issues on BWP operation",3GPP TSG RAN WG1 Meeting NR Ad Hoc,R1-1800262,Vancouver, Canada, Jan. 22-26, 2018,total 3 pages.

"3rd Generation Partnership Project; Technical Specification Group Radio Access Network; NR; Physical layer procedures for data (Release 15)", 3GPP TS 38.214 V15.0.0 (Dec. 2017), 71 pages.

Spreadtrum Communications, "Remaining issues on BWP", 3GPP TSG RAN WG1 Meeting AH 1801, R1-1800283, Vancouver, Canada, Jan. 22-26, 2018, 6 pages.

"3rd Generation Partnership Project; Technical Specification Group Radio Access Network; NR;Multiplexing and channel coding (Release 15)", 3GPP TS 38.212 V15.0.0 (Dec. 2017), 82 pages.

Huawei, "CR to 38.212 capturing the RAN1#92bis and RAN1#93 meeting agreements", 3GPP TSG RAN WG1 Meeting #93, R1-1807956, May 21-25, 2018, 26 pages, Busan, Korea.

NTT Docomo, Inc., "DCI contents and formats", 3GPP TSG RAN WG1 Meeting AH 1801, R1-1800671 , Jan. 22-26, 2018, 12 pages, Vancouver, Canada.

* cited by examiner

DOWNLINK CONTROL INFORMATION TRANSMISSION METHOD

CROSS-REFERENCE TO RELATED APPLICATIONS

This application is a continuation of International Application No. PCT/CN2019/074555, filed on Feb. 2, 2019, which claims priority to Chinese Patent Application No. 201810152331.5, filed with the Chinese Patent Office on Feb. 14, 2018 which are incorporated herein by reference in their entireties.

TECHNICAL FIELD

This application relates to the field of communications technologies, and in particular, to a downlink control information transmission method, an apparatus, and a system.

BACKGROUND

In a wireless communications system, a network device may send downlink control information (DCI) to a terminal device, to indicate data transmission between the network device and the terminal device. For example, the network device sends the DCI to the terminal device through a downlink control channel (PDCCH). The DCI includes scheduling information of a data channel, and the scheduling information may include a transmission parameter of the data channel. The network device and the terminal device perform data transmission through the data channel based on the transmission parameter. The DCI plays an important role in data transmission. Therefore, in the wireless communications system, design of the DCI is a key research subject.

SUMMARY

According to a first aspect, an embodiment of this application provides a downlink control information transmission method, including: receiving first DCI in search space of a first BWP, where the first DCI includes first information, and the first information in the first DCI is used to determine scheduling information of a second BWP.

In a possible implementation, that the first DCI includes first information, and the first information is used to determine scheduling information of a second BWP includes: if a frequency domain resource allocation type of the first BWP is a type 0, an $L_f$-bit frequency domain resource allocation indication in the first DCI is an $L_f$-bit bitmap, where bits in the $L_f$-bit bitmap in descending order are respectively corresponding to an RBG 0 to an RBG ($L_f$−1) in the second BWP; and for one bit in the $L_f$-bit bitmap, when a value of the bit is t1, an allocated resource includes one RBG corresponding to the bit; or when a value of the bit is t2 or is not t1, an allocated resource does not include one RBG corresponding to the bit. t1 and t2 may be integers. For example, t1 is 1.

In a possible implementation, that the first DCI includes first information, and the first information is used to determine scheduling information of a second BWP includes: if a frequency domain resource allocation type of the first BWP is a type 1, an $L_f$-bit frequency domain resource allocation indication in the first DCI is used to indicate an index of a start RB allocated in the second BWP and a quantity of RBs consecutively allocated in the second BWP. Optionally, for the first DCI, direct VRB-to-PRB mapping is preconfigured, and that frequency-domain frequency hopping is not enabled is preconfigured.

In a possible implementation, that the first DCI includes first information, and the first information is used to determine scheduling information of a second BWP includes: the first DCI includes an $L_T$-bit time domain resource allocation indication, $\lceil \log_2(X) \rceil$ bits in the $L_T$-bit time domain resource allocation indication are used to indicate a specific piece of time domain resource allocation information, configured in the second BWP, in X pieces of time domain resource allocation information, the X pieces of time domain resource allocation information are included in $N_{BWP,2}^{TF}$ pieces of time domain resource allocation information, and the $N_{BWP,2}^{TF}$ pieces of time domain resource allocation information are candidate time domain resource allocation information corresponding to the second BWP; the X pieces of time domain resource allocation information are $2^X$ pieces of time domain resource allocation information with maximum timing offsets among the $N_{BWP,2}^{TF}$ pieces of time domain resource allocation information, and a timing offset of time domain resource allocation information is determined based on k1 in the time domain resource allocation information and an identifier of a start symbol of a PUSCH in the time domain resource; and k1 is a distance k1 between a slot for communicating the first DCI and a slot for communicating the PUSCH corresponding to the first DCI.

In a possible implementation, that the first DCI includes first information, and the first information is used to determine scheduling information of a second BWP includes: $\lceil \log_2(Z) \rceil$ bits in $L_{PM}$ bits of precoding information and a layer quantity in the first DCI are used to indicate a specific TPMI and a specific layer quantity, configured for UE in the second BWP, in Z TPMI-layer quantity configurations, and the Z TPMI-layer quantity configurations are candidate TPMI-layer quantity configurations of the second BWP. The Z TPMI-layer quantity configurations are Z TPMI-layer quantity configurations corresponding to a relatively small quantity of layers among $N_{BWP,2}^{PM}$ TPMI-layer quantity configurations. Optionally, the Z TPMI-layer quantity configurations corresponding to a relatively small quantity of layers are corresponding to one layer and/or two layers.

In a possible implementation, that the first DCI includes first information, and the first information is used to determine scheduling information of a second BWP includes: the first DCI includes a 1-bit rate matching indicator, used to enable a rate matching resource in a resource group in two resource groups, where the resource group is included in the two resource groups, and the two resource groups are resource groups in the second BWP. When a value of the rate matching indicator in the first DCI is 0, it indicates that rate matching resources in a resource group 0 and a resource group 1 in the second BWP are enabled; or when a value of the rate matching indicator in the first DCI is 1, it indicates that a rate matching resource in the resource group 1 is enabled.

According to a second aspect, an embodiment of this application provides a downlink control information transmission method, including: sending first DCI in search space of a first BWP, where the first DCI includes first information, and the first information in the first DCI is used to indicate scheduling information of a second BWP. That "the first DCI includes first information, and the first information in the first DCI is used to determine scheduling information of a second BWP" is the same as corresponding descriptions in the first aspect. No further details are provided herein.

According to a third aspect, an embodiment of this application provides an apparatus. The apparatus is capable of implementing one or more functions in the first aspect and the possible implementations of the first aspect. The function may be implemented by using hardware, software, or a combination of hardware and hardware. The hardware or software includes one or more modules corresponding to the function. In an example, the apparatus includes a processor, a memory, and a transceiver. The memory is coupled to the processor, and the processor executes a program instruction stored in the memory. The processor is coupled to the transceiver, and the processor sends and/or receives a signal by using the transceiver. In another example, the apparatus includes a processor and a memory. The memory is coupled to the processor, and the processor executes a program instruction stored in the memory. The processor generates and sends a signal, and/or receives and processes a signal.

In a possible implementation, the processor is configured to receive first DCI in search space of a first BWP, where the first DCI includes first information, and the first information in the first DCI is used to determine scheduling information of a second BWP. That "the first DCI includes first information, and the first information in the first DCI is used to determine scheduling information of a second BWP" is the same as corresponding descriptions in the first aspect. No further details are provided herein.

According to a fourth aspect, an embodiment of this application provides an apparatus. The apparatus is capable of implementing one or more functions in the second aspect and the possible implementations of the second aspect. The function may be implemented by using hardware, software, or a combination of hardware and hardware. The hardware or software includes one or more modules corresponding to the function. In an example, the apparatus includes a processor, a memory, and a transceiver. The memory is coupled to the processor, and the processor executes a program instruction stored in the memory. The processor is coupled to the transceiver, and the processor sends and/or receives a signal by using the transceiver. In another example, the apparatus includes a processor and a memory. The memory is coupled to the processor, and the processor executes a program instruction stored in the memory. The processor generates and sends a signal, and/or receives and processes a signal.

In a possible implementation, the processor is configured to send first DCI in search space of a first BWP, where the first DCI includes first information, and the first information in the first DCI is used to indicate scheduling information of a second BWP. That "the first DCI includes first information, and the first information in the first DCI is used to determine scheduling information of a second BWP" is the same as corresponding descriptions in the first aspect. No further details are provided herein.

According to a fifth aspect, an embodiment of this application provides an apparatus. The apparatus includes a communications module, configured to receive first DCI in search space of a first BWP, where the first DCI includes first information, and the first information in the first DCI is used to determine scheduling information of a second BWP. That "the first DCI includes first information, and the first information in the first DCI is used to determine scheduling information of a second BWP" is the same as corresponding descriptions in the first aspect. No further details are provided herein.

According to a sixth aspect, an embodiment of this application provides an apparatus. The apparatus includes a DCI generation module, configured to generate first DCI; and a communications module, configured to send first DCI in search space of a first BWP, where the first DCI includes first information, and the first information in the first DCI is used to indicate scheduling information of a second BWP. That "the first DCI includes first information, and the first information in the first DCI is used to determine scheduling information of a second BWP" is the same as corresponding descriptions in the first aspect. No further details are provided herein.

According to a seventh aspect, an embodiment of this application provides a computer program product including an instruction. When the computer program product runs on a computer, the computer is enabled to perform one or more of the first aspect and the possible implementations of the first aspect.

According to an eighth aspect, an embodiment of this application provides a computer program product including an instruction. When the computer program product runs on a computer, the computer is enabled to perform one or more of the second aspect and the possible implementations of the second aspect.

According to a ninth aspect, an embodiment of this application provides a communications system, including the apparatus in any one of the third aspect or the possible implementations of the third aspect and the apparatus in any one of the fourth aspect or the possible implementations of the fourth aspect.

According to a tenth aspect, an embodiment of this application provides a communications system, including the apparatus in any one of the fifth aspect or the possible implementations of the fifth aspect and the apparatus in any one of the sixth aspect or the possible implementations of the sixth aspect.

According to an eleventh aspect, an embodiment of an embodiment of this application provides a chip system. The chip system includes a processor, and may further include a memory, configured to implement one or more of the first aspect and the possible implementations of the first aspect.

According to a twelfth aspect, an embodiment of an embodiment of this application provides a chip system. The chip system includes a processor, and may further include a memory, configured to implement one or more of the second aspect and the possible implementations of the second aspect.

An embodiment of this application provides a downlink control information transmission method, including: receiving first DCI in search space of a first carrier bandwidth part BWP, where if a frequency domain resource allocation type of the first BWP is a type 0, an $L_f$-bit frequency domain resource allocation indication in the first DCI is an $L_f$-bit bitmap, where bits in the $L_f$-bit bitmap in descending order are respectively corresponding to resource block groups RBG 0 to RBG ($L_f-1$) in a second BWP, and $L_f$ is a positive integer; and for one bit in the $L_f$-bit bitmap, when a value of the bit is 1, an allocated resource includes one RBG corresponding to the bit; or when a value of the bit is not 1, an allocated resource does not include one RBG corresponding to the bit.

An embodiment of this application provides a downlink control information transmission method, including: sending first DCI in search space of a first carrier bandwidth part BWP, where if a frequency domain resource allocation type of the first BWP is a type 0, an $L_f$-bit frequency domain resource allocation indication in the first DCI is an $L_f$-bit bitmap, where bits in the $L_f$-bit bitmap in descending order are respectively corresponding to resource block groups RBG 0 to RBG ($L_f-1$) in a second BWP, and $L_f$ is a positive integer; and for one bit in the $L_f$-bit bitmap, when a value of the bit is 1, an allocated resource includes one RBG corresponding to the bit; or when a value of the bit is not 1, an allocated resource does not include one RBG corresponding to the bit.

DETAILED DESCRIPTION OF ILLUSTRATIVE EMBODIMENTS

Figure 1:
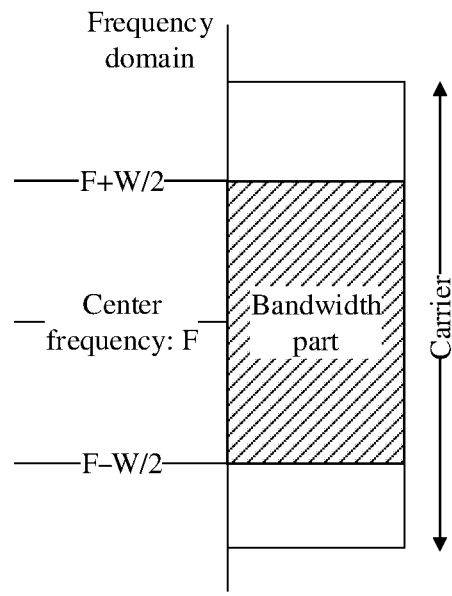
FIG. 1 is a diagram of an example carrier bandwidth part BWP according to an embodiment of this application.

Technical solutions provided in the embodiments of this application can be applied to various communications systems. For example, the technical solutions provided in the embodiments of this application may be applied to a communications system in which a network device sends DCI to a terminal device, or may be applied to a communications system in which a network device sends scheduling information to a terminal device. For example, the technical solutions may be applied to a fifth generation (5G) mobile communications system, a long term evolution (LTE) system, and a future communications system. 5G may also be referred to as new radio (NR).

A wireless communications system includes communications devices, and the communications devices may perform wireless communication by using an air interface resource. The communications device may include a network device and a terminal device, and the network device may also be referred to as a network-side device. The air interface resource may include at least one of a time domain resource, a frequency domain resource, a code resource, and a spatial resource. The time domain resource and the frequency domain resource may also be referred to as a time-frequency resource.

In the embodiments of this application, "at least one" may also be described as "one or more", and "a plurality of" may be "two, three, four, or more". This is not limited in this application.

In the embodiments of this application, for a technical feature, when a quantity of technical features is being described, a value of the quantity of technical features is an integer or a positive integer.

In the embodiments of this application, for an information bit, when a quantity of bits of the information bit is being described, a value of the quantity of bits of the information bit is an integer or a positive integer. For an information bit, when a quantity of bits of the information bit is being described, a value of the quantity of bits of the information bit is an integer or a positive integer. For an information bit, when a size of the information bit is being described, a value of the size of the information bit is an integer or a positive integer.

In the embodiments of this application, an integer may be zero, one, two, three, four, or more; a positive integer may be one, two, three, four, or more. This is not limited in this application.

In the embodiments of this application, "first", "second", "third", "A", "B", "C", "D", and the like are used for distinguishing between technical features described by them. There is no chronological order or no size order between the technical features described by "first", "second", "third", "A", "B", "C", and "D".

The terminal device in the embodiments of this application may also be referred to as a terminal, and may be a device having wireless receiving and sending functions. The terminal device may be deployed on land, including an indoor device, an outdoor device, a handheld device, or a vehicle-mounted device; may be deployed on the surface of water (such as in a steamship); or may be deployed in the air (such as on an airplane, a balloon, and a satellite). The terminal device may be user equipment (UE). The UE is a handheld device, a vehicle-mounted device, a wearable device, or a computing device that has a wireless communication function. For example, the UE may be a mobile phone, a tablet computer, or a computer having wireless receiving and sending functions. Alternatively, the terminal device may be a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in a smart city, a wireless terminal in a smart home, or the like. In the embodiments of this application, an apparatus that implements a function of the terminal may be a terminal, or may be an apparatus that supports the terminal in implementing the function. In the embodiments of this application, an example in which the apparatus that implements the function of the terminal is a terminal and the terminal is UE is used for describing the technical solutions provided in the embodiments of this application.

The network device in the embodiments of this application includes a base station (BS), and may be a device that is deployed in a radio access network and that can perform wireless communication with the terminal. The base station may be in a plurality of forms, for example, a macro base station, a micro base station, a relay node, and an access point. For example, the base station in the embodiments of this application may be a base station in 5G or an evolved NodeB in LTE, and the base station in 5G may also be referred to as a transmission/reception point (TRP) or a gNB. In the embodiments of this application, an apparatus that implements a function of the network device may be a network device, or may be an apparatus that supports the network device in implementing the function. In the embodiments of this application, an example in which the apparatus that implements the function of the network device is a network device and the network device is a base station is used for describing the technical solutions provided in the embodiments of this application.

The technical solutions provided in the embodiments of this application can be applied to wireless communication between communications devices. The wireless communication between communications devices may include wireless communication between a network device and a terminal, wireless communication between network devices, and wireless communication between terminals. In the embodiments of this application, the term "wireless communication" may be referred to as "communication" for short, and the term "communication" may also be described as "data transmission", "information transmission, or "transmission".

In the wireless communications system, the base station can manage one or more cells, and one cell may include an integer quantity of UE. In the cell, the base station and the UE may perform wireless communication by using an air interface resource. In a possible wireless communications system, for example, in a 5G system, an air interface resource includes a frequency domain resource. The frequency domain resource may be located within a specified frequency range. The frequency range may also be referred to as a band or a frequency band. A center point of the frequency domain resource may be referred to as a center frequency, and a width of the frequency domain resource may be referred to as a bandwidth (BW).

When the base station and the UE perform wireless communication by using a frequency domain resource, the base station manages a carrier frequency domain resource, and allocates a frequency domain resource in the carrier frequency domain resource to the UE, so that the base station and the UE can use the allocated frequency domain resource to perform communication. The carrier frequency domain resource may be a system frequency domain resource, may be a frequency domain resource that can be managed and allocated by the base station, or may be a frequency domain resource that can be used for communication between the base station and the UE. The carrier frequency domain resource may be a segment of consecutive frequency domain resources, and the carrier frequency domain resource may also be referred to as a carrier. A width of the carrier may be referred to as a system bandwidth, a carrier bandwidth, or a transmission bandwidth. In the embodiments of this application, the frequency domain resource may also be referred to as a frequency resource or may have other names. This is not limited in this application.

A possible design of allocating a frequency domain resource by the base station to the UE is: The base station configures a carrier bandwidth part (BWP) in the carrier for the UE, and the base station schedules a resource to the UE in the configured BWP. This design may also be described as: The base station configures a BWP in the carrier for the UE, and the base station can allocate some or all of resources in the configured BWP to the UE, for communication between the base station and the UE. The BWP configured by the base station for the UE is included in the carrier, and may be some consecutive or inconsecutive resources in the carrier or may be all resources in the carrier. The BWP may also be referred to as a bandwidth resource, a frequency domain resource part, some frequency domain resources, a frequency resource part, some frequency resources, or a carrier BWP, or may have other names. This is not limited in this application. When the BWP is a segment of consecutive resources in the carrier, the BWP may also be referred to as a subband or a narrowband, or may have other names. This is not limited in this application. For example, FIG. 1 is a diagram of an example BWP. As shown in FIG. 1, the BWP is a segment of consecutive resources in a carrier, a bandwidth of the BWP is W, and a center frequency of the BWP is F. This may also be described as: A frequency of a highest frequency in the BWP is F+W/2, and a frequency of a lowest frequency in the BWP is F−W/2.

For example, the foregoing possible design of allocating a frequency domain resource by the base station to the UE may be applied to but is not limited to at least one of the following scenarios.

Scenario 1: Large-Bandwidth Scenario

In a communications system, as a service volume of UE and a quantity of UEs increase, a system service volume significantly increases. Therefore, a design of using a large bandwidth as a carrier bandwidth is proposed in an existing communications system, and is used for providing a relatively large quantity of system resources, so that a relatively high data transmission rate can be provided. In the communications system in which a large bandwidth is used as the carrier bandwidth, a bandwidth supported by the UE may be smaller than the carrier bandwidth in consideration of costs of the UE and the service volume of the UE. A larger bandwidth supported by the UE indicates a higher processing capability of the UE, a possible higher data transmission rate of the UE, and possible higher design costs of the UE. The bandwidth supported by the UE may also be referred to as a bandwidth capability of the UE. For example, in the 5G system, a maximum value of the carrier bandwidth may be 400 MHz, and the bandwidth capability of the UE may be 20 MHz, 50 MHz, 100 MHz, or the like. In the wireless communications system, bandwidth capabilities of different UEs may be identical or different. This is not limited in the embodiments of this application.

In the embodiments of this application, the bandwidth capability of the UE may also be described as the bandwidth supported by the UE. The bandwidth capability of the UE may include a downlink bandwidth capability of the UE and an uplink bandwidth capability of the UE. The downlink bandwidth capability of the UE is used to describe a bandwidth supported by the UE when the UE performs receiving. The downlink bandwidth capability may also be referred to as a receiving bandwidth capability or a downlink receiving bandwidth capability, or may have other names. This is not limited in this application. The uplink bandwidth capability of the UE is used to describe a bandwidth supported by the UE when the UE performs sending. The uplink bandwidth capability may also be referred to as a sending bandwidth capability or an uplink sending bandwidth capability, or may have other names. This is not limited in this application. The downlink bandwidth capability of the UE may be the same as or different from the uplink bandwidth capability of the UE. This is not limited in this application.

In the communications system in which a large bandwidth is used as the carrier bandwidth, because the bandwidth capability of the UE is smaller than the carrier bandwidth, the base station may configure a BWP in the carrier for the UE, where a bandwidth of the BWP is smaller than or equal to the bandwidth capability of the UE. When the UE and the base station perform communication, the base station may schedule a resource to the UE based on the BWP configured for the UE. To be specific, the base station may allocate, to the UE, some or all of resources in the BWP configured for the UE, for communication between the base station and the UE.

In the embodiments of this application, the carrier may include a downlink carrier and an uplink carrier. The downlink carrier is used for downlink transmission between the base station and the UE, and the uplink carrier is used for uplink transmission between the base station and the UE. The downlink carrier may be the same as or different from the uplink carrier. This is not limited in this application.

In the embodiments of this application, the BWP of the UE may be used for uplink transmission and/or downlink transmission between the base station and the UE. A BWP used for uplink transmission may be referred to as an uplink BWP or may have other names, and a BWP used for downlink transmission may be referred to as a downlink BWP or may have other names. The uplink BWP may be the same as or different from the downlink BWP. This is not limited in this application. The uplink BWP is included in the uplink carrier, and a bandwidth of the uplink BWP may be smaller than or equal to the sending bandwidth capability of the UE. The downlink BWP is included in the downlink carrier, and a bandwidth of the downlink BWP may be smaller than or equal to the receiving bandwidth capability of the UE. The BWP of the UE may be of a self-contained structure. To be specific, the UE is not expected to perform downlink receiving on a frequency domain resource other than the downlink BWP of the UE, and the UE is not expected to perform uplink sending on a frequency domain resource other than the uplink BWP of the UE.

Scenario 2: Multi-Parameter Scenario

In the wireless communications system, for example, in the 5G system, a design supporting a plurality of parameters is proposed to support more service types and/or communication scenarios. A separate parameter may be set for each of different service types and/or communication scenarios. The parameter includes at least one of a subcarrier spacing and a cyclic prefix (CP). In a standard of the wireless communications system researched and formulated by the third generation partnership project (3GPP), the parameter may be referred to as a numerology in English.

In a possible configuration, the base station may configure a plurality of BWPs in the carrier, and configure a separate numerology for each of the plurality of BWPs, to support a plurality of service types and/or communication scenarios in the carrier. Numerologies of different BWPs may be identical or different, and one or more BWPs may be configured for the UE. This is not limited in this application.

When the UE and the base station perform communication, the base station may determine, based on a service type and/or a communication scenario corresponding to the communication, a numerology A used for communication, to configure a corresponding BWP for the UE based on the numerology A. A numerology of the corresponding BWP is configured as the numerology A. When the UE and the base station perform communication, the base station may schedule a resource to the UE based on the BWP configured for the UE. To be specific, the base station may allocate, to the UE, some or all of resources in the BWP configured for the UE, for communication between the base station and the UE.

Scenario 3: Bandwidth Fallback

When the UE and the base station perform communication, the base station may configure a BWP for the UE based on a service volume of the UE, to reduce power consumption of the UE. For example, if the UE has no service, the UE may receive control information in a BWP with a relatively small bandwidth, to reduce radio frequency processing workloads and baseband processing workloads of the UE, thereby reducing power consumption of the UE. If a service volume of the UE is relatively small, the base station may configure a BWP with a relatively small bandwidth for the UE, to reduce radio frequency processing workloads and baseband processing workloads of the UE, thereby reducing power consumption of the UE. If a service volume of the UE is relatively large, the base station may configure a BWP with a relatively large bandwidth for the UE, to provide a higher data transmission rate. When the UE and the base station perform communication, the base station may schedule a resource to the UE based on the BWP configured for the UE. To be specific, the base station may allocate, to the UE, some or all of resources in the BWP configured for the UE, for communication between the base station and the UE.

Figure 2:
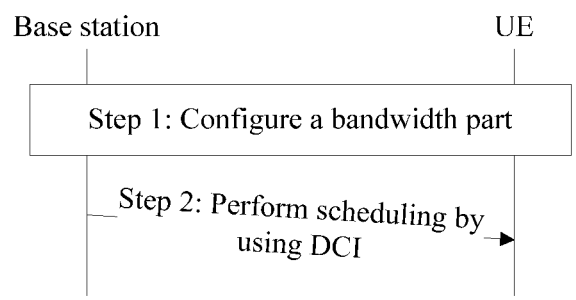
FIG. 2 is a flowchart of a frequency domain resource allocation method according to an embodiment of this application.

Based on the foregoing possible design of allocating a frequency domain resource by the base station to the UE, as shown in FIG. 2, an example frequency domain resource allocation method is as follows: Step 1: The base station configures a BWP in the carrier for the UE by using signaling A or through predefinition. The base station may configure one or more BWPs for the UE, and this is not limited in this application. Step 2: The base station schedules, in the BWP configured for the UE, a resource to the UE by using downlink control information (DCI). To be specific, the base station allocates a frequency domain resource A to the UE by using the DCI, where the frequency domain resource A is a resource in the BWP configured for the UE in step 1. The base station and the UE may perform data transmission on the allocated frequency domain resource A. The signaling A may be radio resource control (RRC) signaling, a broadcast message, a system message, a medium access control (MAC) control element (CE), DCI, or signaling carried on a physical downlink shared channel (PDSCH). The DCI may be signaling sent by the base station to the UE through a physical downlink control channel (PDCCH). In other words, the DCI may be signaling carried on the PDCCH. The DCI may also be referred to as control information or may have other names, and may be used for data transmission between the base station and the UE. For example, the DCI is used for transmitting a PDSCH or a physical uplink shared channel (PUSCH) between the base station and the UE. The PDCCH may also be referred to as a physical control channel or a control channel, or may have other names, and is mainly used to carry, at a physical layer, control information sent by the base station to the UE. The term "carry" may also be described as "bear".

Based on the frequency domain resource allocation method in FIG. 2, in step 1, the base station may configure a plurality of BWPs for the UE. The plurality of BWPs may also be referred to as candidate BWPs, a candidate BWP set, configured BWPs, or a configured BWP set, or may have other names. This is not limited in this application. In step 2, for a first BWP and a second BWP in the plurality of BWPs, the base station may perform a scheduling to the UE in the first BWP by using the DCI. To be specific, the UE may receive, in the first BWP, scheduling information that is sent by the base station by using the DCI. The scheduling information may be scheduling information corresponding to the first BWP, or may be scheduling information corresponding to the second BWP. If the scheduling information is the scheduling information corresponding to the second BWP, a BWP switching function or a cross-BWP scheduling function is implemented. For example, if a currently activated BWP of the UE is the first BWP, the base station may switch the currently activated BWP of the UE to the second BWP based on a communication requirement such as a service requirement or a communication scenario requirement. The currently activated BWP may also be referred to as a current operating BWP or may have other names. The currently activated BWP is a BWP currently used for data transmission between the base station and the UE, for example, a BWP currently used for communicating the PDSCH and/or the PUSCH between the base station and the UE. To implement the BWP switching function or the cross-BWP scheduling function, a BWP indication may be added to the DCI. The scheduling information included in the DCI is scheduling information of a BWP indicated by the BWP indication, or the scheduling information included in the DCI is scheduling information corresponding to a BWP indicated by the BWP indication. For example, as listed in Table 1, BWPs configured by the base station for the UE include $Num_{BWP}=4$ BWPs: a first BWP, a second BWP, a third BWP, and a fourth BWP, and each BWP is corresponding to a unique identifier. DCI may include a BWP indication, and a length of an information bit corresponding to the BWP indication is $\lceil \log_2(Num_{BWP}) \rceil = 2$ bits. A possible value of the two bits and a BWP indicated by the values are listed in Table 1. The possible value of the two bits is a possible value of the BWP indication in the DCI, and the BWP indicated by the value is a BWP indicated by the BWP indication. Scheduling information included in the DCI is scheduling information of the BWP indicated by the BWP indication, and the DCI may also be referred to as DCI of the BWP indicated by the BWP indication in the DCI. For example, based on Table 1, for one piece of DCI, if a value of a BWP indication in the DCI is 01, a BWP indicated by the BWP indication is the second BWP, and the DCI is DCI of the second BWP. In other words, the DCI is DCI corresponding to the second BWP.

TABLE 1

| | Possible value of a BWP indication in DCI | | | |
|---|---|---|---|---|
| | 00 | 01 | 10 | 11 |
| BWP indicated by the BWP indication | First BWP | Second BWP | Third BWP | Fourth BWP |

When DCI is communicated between the base station and the UE through a PDCCH, the base station may configure search space of the PDCCH for the UE. The search space of the PDCCH is corresponding to a PDCCH candidate resource set, and the PDCCH candidate resource set includes N candidate resources that can be used for transmitting the PDCCH, where N is an integer greater than or equal to 1. The base station may select one candidate resource from the PDCCH candidate resource set, for example, select one candidate resource from the PDCCH candidate resource set based on channel quality, and send the PDCCH to the UE on the selected candidate resource. The UE monitors the PDCCH candidate resource set, that is, detects the PDCCH on the candidate resources in the PDCCH candidate resource set. In the embodiments of this application, the search space of the PDCCH may be referred to as search space for short, and the candidate resource of the PDCCH may be referred to as a candidate resource for short. When receiving a PDCCH, the UE does not know, before receiving the PDCCH, a specific resource on which the base station sends the PDCCH in the N candidate resources of the PDCCH, or does not know whether the base station sends a PDCCH to the UE, and the UE considers that the base station may send the PDCCH on any one of the N candidate resources. Consequently, the UE keeps detecting a PDCCH on the N candidate resources until the PDCCH is found. When the UE detects the PDCCH, where the PDCCH carries DCI, the UE performs detection for one to N times, to detect DCI with a specific size. The size of the DCI may be a total quantity of bits of information bits included in the DCI, or may be a total quantity of bits included in the DCI.

When configuring PDCCH search space for the UE, if the base station supports a plurality of BWPs, the base station may configure, for each BWP, PDCCH search space corresponding to the BWP. In other words, the foregoing method for configuring search space of the PDCCH by the base station for the UE may be used for each BWP. The search space of the BWP may be located in the BWP, or may be not located in the BWP. That the search space of the BWP is not located in the BWP means that the search space of the BWP may be not located in a carrier to which the BWP belongs, or that the search space of the BWP may be located in another BWP of a carrier to which the BWP belongs.

For example, for a BWP B, a possible scenario in which PDCCH search space of the BWP B is not located in a carrier to which the BWP B belongs is: For a multicarrier-supported scenario, for example, for a scenario in which the base station and the UE can support to perform data transmission both on a carrier A and a carrier B, if cross-carrier scheduling is supported, for example, if PDCCH search space corresponding to the carrier A is supported to be configured in the carrier B and the BWP B is included in the carrier A, PDCCH search space of the BWP B is in the carrier B.

For another example, for a BWP B, a possible scenario in which PDCCH search space of the BWP B is located in another BWP of a carrier to which the BWP belongs is: For a carrier A, the carrier A includes a BWP B and a BWP C, and if cross-BWP scheduling can be supported, PDCCH search space of the BWP B can be supported to be configured in the BWP C.

When the base station implements the BWP switching function or the cross-BWP scheduling function by using DCI, for example, when scheduling corresponding to the second BWP is performed in search space of the first BWP by using first DCI, or when first DCI is transmitted on a candidate resource corresponding to search space of the first BWP and the first DCI is DCI corresponding to the second BWP, a size of the first DCI can be made to be equal to that of third DCI, and therefore power consumption of the UE is reduced. The third DCI is used for scheduling corresponding to the first BWP in the search space of the first BWP. In other words, the third DCI may be transmitted on the candidate resource corresponding to the search space of the first BWP and the third DCI is DCI corresponding to the first BWP, and the third DCI includes the scheduling information corresponding to the first BWP. In the search space of the first BWP, for UE, if the UE considers that the base station sends the first DCI or the third DCI, to detect a PDCCH carrying the first DCI and a PDCCH carrying the third DCI, when the size of the first DCI is different from that of the third DCI, the UE performs detection for two to 2N times in total; when the size of the first DCI is the same as that of the third DCI, the UE performs detection for one to N times in total. This reduces a quantity of times of detection performed by the UE, compared with the design in which the size of the first DCI is different from that of the third DCI, thereby reducing power consumption of the UE. In the search space of the first BWP, the UE may alternatively consider that the base station may send the first DCI and the third DCI at the same time. This is not limited in this application.

In the foregoing example, the size of the first DCI is made to be equal to that of the third DCI. The size of the third DCI is determined based on a configuration of the first BWP, or the size of the third DCI is configured by the base station for the search space of the first BWP. Optionally, a size of an information field in the third DCI is determined based on the configuration of the first BWP. When the UE uses the size of the third DCI to detect the first DCI and/or the third DCI in the search space of the first BWP, there may be a scenario in which the size of the first DCI is less than that of second DCI, or there may be a scenario in which a size of an information field in the first DCI is less than that of the information field in second DCI. This cannot satisfy a requirement of scheduling corresponding to the second BWP. The second DCI is used for scheduling corresponding to the second BWP. The size of the second DCI is determined based on a configuration of the second BWP, or the size of the second DCI is configured by the base station for search space of the second BWP. A size of an information field in the second DCI is determined based on the configuration of the second BWP. The second DCI may be transmitted on a candidate resource corresponding to the search space of the second BWP, and the UE may use the size of the second DCI to detect the second DCI in the search space of the second BWP. In this case, when the size of the first DCI is less than that of the second DCI, BWP switching or cross-BWP scheduling needs to be performed by using smaller DCI, that is, scheduling corresponding to the second BWP needs to be performed by using the first DCI. When the size of the information field in the first DCI is less than that of the information field in the second DCI, BWP switching or cross-BWP scheduling needs to be supported by using a smaller information field, that is, scheduling corresponding to the second BWP needs to be supported by using the information field in the first DCI. In the embodiments of this application, unless otherwise specified, the first DCI represents DCI used for performing, in the search space of the first BWP, scheduling corresponding to the second BWP; the third DCI represents DCI used for performing, in the search space of the first BWP, scheduling corresponding to the first BWP; and the second DCI represents DCI used for performing, in the search space of the second BWP, scheduling corresponding to the second BWP.

To implement BWP switching or cross-BWP scheduling by using smaller DCI, the embodiments of this application propose the following several design schemes and method embodiments corresponding to the design schemes.

Design Scheme 1: Truncating an Information Field

In the embodiments of this application, DCI may be DCI used to carry uplink scheduling information, is referred to as uplink scheduling DCI for short, and is used for scheduling transmission of a PUSCH or another uplink channel; or may be DCI used to carry downlink scheduling information, is referred to as downlink scheduling DCI for short, and is used for scheduling transmission of a PDSCH or another downlink channel. In addition to a BWP indication, the uplink scheduling DCI or the downlink scheduling DCI may include other information such as a frequency domain resource allocation indication, a time domain resource allocation indication, or a DMRS antenna port. Information in the DCI may also be referred to as an information field, a transmission parameter, or a scheduling transmission parameter, or may have other names. This is not limited in this application. A size of the information in the DCI is used to describe a quantity of bits of the information or a quantity of bits of the information. The size of the information may also be referred to as dimensions of the information, a quantity of bits of the information, a length of the information, or a quantity of bits of the information, or may have other names. This is not limited in this application.

When BWP switching or cross-BWP scheduling is performed by using smaller DCI, that is, when scheduling corresponding to the second BWP is performed in the search space of the first BWP by using the first DCI, the size of the first DCI is less than that of the second DCI. The size of the second DCI is determined based on the configuration of the second BWP, or the size of the second DCI is configured by the base station for the search space of the second BWP. The UE may use the size of the second DCI to detect the second DCI in the search space of the second BWP. For example, the second DCI includes at least one information field, and a size of an information field in the at least one information field is determined based on the configuration of the second BWP. The size of the second DCI may be a sum of sizes of information fields in the second DCI. For an information field in the DCI, if both the first DCI and the second DCI include the information field, and the size of the first DCI is less than that of the second DCI, a size of the information field in the first DCI may be less than that of the information field in the second DCI, that is, the information field in the first DCI is a truncated information field relative to the information field in the second DCI. Therefore, one case of performing BWP switching or cross-BWP scheduling by using smaller DCI is performing BWP switching or cross-BWP scheduling by using the truncated information field.

BWP switching or cross-BWP scheduling is supported by using a smaller information field, and the size of the information field in the first DCI is less than that of the information field in the second DCI, that is, the information field in the first DCI is a truncated information field relative to the information field in the second DCI. Therefore, supporting BWP switching or cross-BWP scheduling by using a smaller information field may also be described as performing BWP switching or cross-BWP scheduling by using the truncated information field.

To implement BWP switching or cross-BWP scheduling by using a truncated information field, the following separately describes, specific to uplink scheduling DCI and downlink scheduling DCI based on specific content of an information field, method embodiments corresponding to the design scheme 1.

(1) Uplink scheduling DCI (a1) Frequency domain resource allocation (frequency domain resource assignment) indication The uplink scheduling DCI may include a frequency domain resource allocation indication, used to indicate a frequency domain resource that is allocated by the base station to the UE in an uplink BWP. The BWP is a BWP indicated by a BWP indication in the DCI. For example, a frequency domain resource indicated by the frequency domain resource allocation indication may be a subcarrier, a resource block (RB), or a resource block group (RBG). One RB includes a positive integer quantity of subcarriers. For example, one RB includes 12 subcarriers. One RBG includes a positive integer quantity of RBs. The quantity of RBs in the RBG may also be referred to as a size of the RBG or dimensions of the RBG, or may have other names. The RB may be a physical resource block (PRB), or may be a virtual resource block (VRB).

Figure 3:
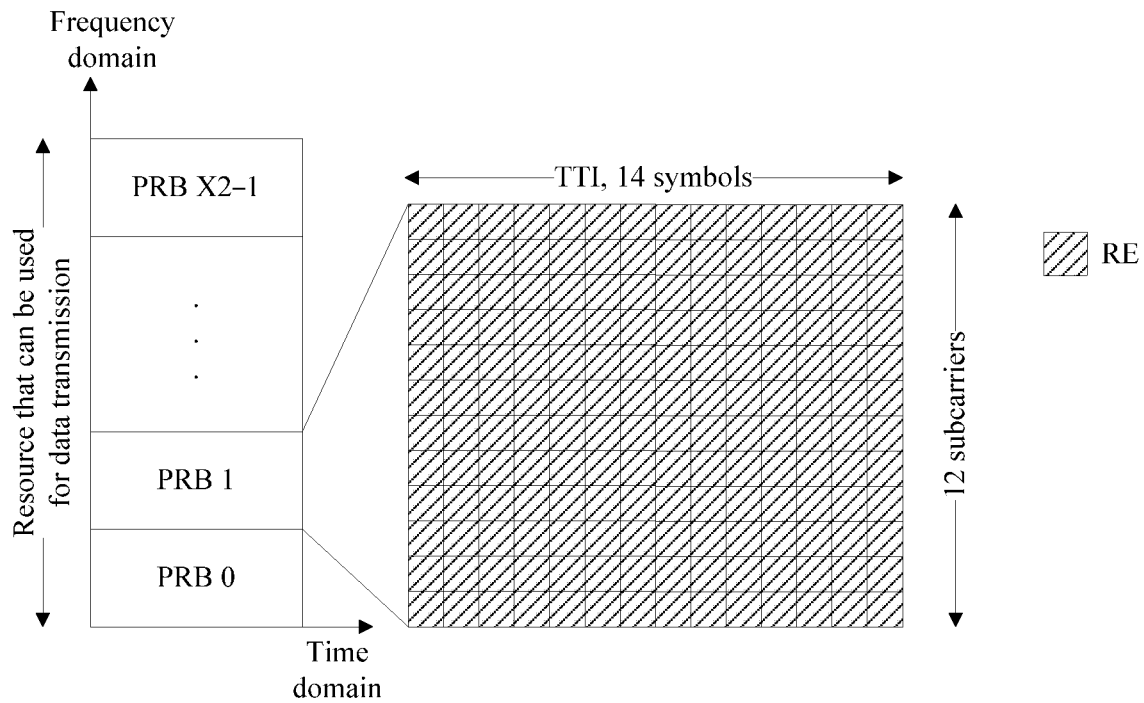
FIG. 3 is a diagram of an example air interface resource according to an embodiment of this application.

In the wireless communications system, for example, in a communications system based on orthogonal frequency division multiplexing (OFDM), FIG. 3 is a diagram of an example air interface resource. As shown in FIG. 3, a resource that can be used for data transmission includes several resource grids, and a resource grid may be referred to as a resource element (RE). One RE is corresponding to one subcarrier in frequency domain, and is corresponding to one symbol in time domain. As shown in FIG. 3, a resource that can be used for data transmission in frequency domain may be a carrier or a BWP. This is not limited in this application. One PRB includes X1 resource grids in frequency domain, where X1 is an integer greater than 1. For example, X1 is 12. A bandwidth of the resource that can be used for data transmission may be referred to as X2 PRBs, where X2 is an integer greater than or equal to 1. PRBs in the resource that can be used for data transmission may be successively numbered from 0 to X2−1 in ascending order of frequencies, to obtain number values of the PRBs, where a number value of each PRB is used to uniquely identify the PRB. The term "number value" may also be referred to as a "number", an "identifier", or an "index" in the embodiments of this application. As shown in FIG. 3, the bandwidth of the resource that can be used for data transmission includes a total of X2 PRBs: a PRB 0 to a PRB (X2−1). For different subcarrier spacings, quantities of subcarriers in a PRB corresponding to the different subcarrier spacings may be configured to be the same or different. This is not limited in this application. In the embodiments of this application, for a BWP, a bandwidth of a PRB in the BWP is determined based on a subcarrier spacing of the BWP and a quantity of subcarriers in the PRB in the BWP. For example, for a BWP, if a subcarrier spacing of the BWP is 15 kHz, and one PRB includes 12 subcarriers, a bandwidth of the PRB in the BWP is 180 kHz. For another example, for a BWP, if a subcarrier spacing of the BWP is 60 kHz, and one PRB includes 12 subcarriers, a bandwidth of the PRB in the BWP is 720 kHz.

In the resource that can be used for data transmission in frequency domain, one PRB is corresponding to one VRB. The VRB may include a centralized VRB or a distributed VRB. A centralized VRB is directly mapped to a PRB. To be specific, an index of a PRB corresponding to a VRB whose index is $n_{VRB}$ is $n_{PRB}$, where $n_{PRB}=n_{VRB}$. A distributed VRB may be mapped to a PRB according to a specific rule. The rule may be a mapping method commonly used by a person skilled in the art. For example, the mapping method may be an interleaving-based mapping method in a 3GPP standard protocol. For example, the 3GPP standard protocol may be an LTE standard protocol or a 5G standard protocol.

In the embodiments of this application, one BWP includes $N_{RBG}$ RBGs. The RBGs in the BWP may be successively numbered from 0 to $N_{RBG}-1$ in ascending order of frequencies, to obtain number values of the RBGs, where a number value of each RBG is used to uniquely identify the RBG. In the $N_{RBG}$ RBGs, a size of the first RBG and a size of the last RBG each may be less than P and greater than or equal to 1, or a size of the first RBG and a size of the last RBG each may be equal to P, and a size of a remaining RBG may be equal to P, where P is an integer greater than or equal to 1. When P is equal to 1, one RBG may be considered as one RB.

In the embodiments of this application, when the frequency domain resource allocation indication is used for resource allocation, a resource allocation type may be a type 0, a type 1, or a type 0 and a type 1. In the embodiments of this application, the type 0 and the type 1 are used to describe different resource allocation methods. That the resource allocation type is a type 0 and a type 1 may be understood as: The type 0 and the type 1 are candidate resource allocation types, and the resource allocation type may further be configured as the type 0 or the type 1.

Resource Allocation Type: Type 0

For a BWP A, when scheduling corresponding to the BWP A is performed in search space of the BWP A by using DCI A, where the DCI A includes a frequency domain resource allocation indication, and when the resource allocation type is the type 0, if the BWP A is an initial BWP that is configured by using a broadcast message, the frequency domain resource allocation indication in the DCI A may include an $N_{BWP,A}^{RBG}=\lceil N_{BWP,A}^{size}/P_A \rceil$-bit bitmap; or if the BWP A is a BWP that is configured by using RRC signaling or a system message, the frequency domain resource allocation indication in the DCI A may include an $N_{BWP,A}^{RBG}=\lceil N_{BWP,A}^{size}+(N_{BWP,A}^{start} \bmod P_A))/P_A \rceil$-bit bitmap. $N_{BWP,A}^{size}$ is a quantity of RBs in the BWP A, $N_{BWP,A}^{start}$ is an index of a common RB corresponding to a start PRB in the BWP A, and $P_A$ is a quantity of RBs in an RBG in the BWP A. One bit in the $N_{BWP,A}^{RBG}$-bit bitmap is corresponding to one RBG in the BWP A, and the bit may also be referred to as one information bit. For example, RBGs in the BWP A in ascending order of indexes are respectively in a one-to-one correspondence with a least significant bit to a most significant bit in the $N_{BWP,A}^{RBG}$-bit bitmap. For one bit in the $N_{BWP,A}^{RBG}$-bit bitmap, when a value of the bit is t1, a resource allocated by the base station to the UE includes one RBG corresponding to the bit; or when a value of the bit is t2 or is not t1, a resource allocated by the base station to the UE does not include one RBG corresponding to the bit. t1 and t2 may be integers. For example, t1 is 1. In the embodiments of this application, the type 0 may also be referred to as a resource allocation type 0 or a first resource allocation type, or may have other names. This is not limited in this application. In a possible implementation, if the resource allocation type is the type 0, an RB in a resource allocation method corresponding to the type 0 is a PRB. In the embodiments of this application, the BWP A may be the first BWP, the second BWP, or any other BWP. This is not limited in this application.

A frequency domain resource may be identified by a common RB. Common RBs are numbered from a common RB 0 in ascending order of frequencies. The start PRB in the BWP A is corresponding to a common RB whose index is $N_{BWP,A}^{start}$, or an offset of a frequency location of the start PRB in the BWP A relative to a frequency location of the common RB 0 is $N_{BWP,A}^{start}$ RBs. In the frequency domain resource, a location of the common RB 0 is determined based on a reference frequency location and an offset of the common RB 0 relative to the reference frequency location. The following provides examples.

(1) For a downlink carrier corresponding to a primary serving cell, the reference frequency location is determined based on an RB, whose frequency is lowest, corresponding to a synchronization signal block used for access by the UE.

(2) For an uplink carrier corresponding to a primary serving cell in an unpaired spectrum, the reference frequency location is determined based on an RB, whose frequency is lowest, corresponding to a synchronization signal block used for access by the UE.

(3) For an uplink carrier corresponding to a primary serving cell in a paired spectrum, the reference frequency location is determined based on a frequency location configured by the base station. The frequency location may be corresponding to an absolute radio frequency channel number (ARFCN).

(4) For a secondary serving cell, the reference frequency location is determined based on a frequency location configured by the base station. The frequency location may be corresponding to an absolute radio frequency channel number ARFCN.

(5) For a supplementary uplink carrier, the reference frequency location is determined based on a frequency location configured by the base station. The frequency location may be corresponding to an absolute radio frequency channel number ARFCN.

Resource Allocation Type: Type 1

For a BWP A, when scheduling corresponding to the BWP A is performed in search space of the BWP A by using DCI A, where the DCI A includes a frequency domain resource allocation indication, and when the resource allocation type is the type 1, the frequency domain resource allocation indication in the DCI A may include a $\lceil \log_2(N_{BWP,A}^{size}(N_{BWP,A}^{size}+1)/2)\rceil$-bit resource indicator value (RIV), where $N_{BWP,A}^{size}$ is a quantity of RBs in the BWP A. The RIV is used to indicate an index of a start RB allocated by the base station to the UE in the BWP A and a quantity of RBs consecutively allocated by the base station to the UE in the BWP A. For example:

if $L_{RBs}-1 \leq \lceil N_{BWP,A}^{size}/2 \rceil$, $RIV=N_{BWP,A}^{size}(L_{RBs}-1)+RB_{BWP,A}^{start}$ else $RIV=N_{BWP,A}^{size}(N_{BWP,A}^{size}-L_{RBs}+1)+(N_{BWP,A}^{size}-1-RB_{BWP,A}^{start})$ $L_{RBs}$ is the quantity of consecutively allocated RBs, $0<L_{RBs} \leq N_{BWP,A}^{size}-RB_{BWP,A}^{start}$, and $RB_{BWP,A}^{start}$ is the index of the allocated start RB. In the embodiments of this application, the type 1 may also be referred to as a resource allocation type 1 or a second resource allocation type, or may have other names. This is not limited in this application. In a possible implementation, if the resource allocation type is the type 1, an RB in a resource allocation method corresponding to the type 1 is a PRB or a VRB. In this case, the DCI A may include VRB-to-PRB mapping information. For example, a size of the VRB-to-PRB mapping information is one bit, indicating whether the VRB is directly mapped to the PRB or is mapped to the PRB based on interleaving in the resource allocation method. The DCI A may further include frequency-domain frequency hopping enabling indication information. For example, a size of the frequency-domain frequency hopping enabling indication information is one bit. In the embodiments of this application, the frequency-domain frequency hopping enabling indication information is used to indicate whether to enable frequency-domain frequency hopping. If the frequency-domain frequency hopping is enabled, the $\lceil \log_2(N_{BWP,A}^{size}(N_{BWP,A}^{size}+1)/2)\rceil$ bits in the frequency domain resource allocation indication may include $N_{hop}$ bits used to indicate a frequency hopping offset, and an information bit in the $\lceil \log_2(N_{BWP,A}^{size}(N_{BWP,A}^{size}+1)/2)\rceil$ bits other than the $N_{hop}$ bits is used to indicate the index of the start RB and the quantity of consecutively allocated RBs. Optionally, one bit used to indicate the VRB-to-PRB mapping information may be the same as the one bit used to indicate frequency-domain frequency hopping enabling.

Resource Allocation Type: Type 0 and Type 1

For a BWP A, when scheduling corresponding to the BWP A is performed in search space of the BWP A by using DCI A, where the DCI A includes a frequency domain resource allocation indication, and when the resource allocation type is the type 0 and the type 1, the frequency domain resource allocation indication in the DCI A may include $\max(\lceil \log_2(N_{BWP,A}^{size}(N_{BWP,A}^{size}+1)/2)\rceil, N_{BWP,A}^{RBG})+1$ bits. One bit in the $\max(\lceil \log_2(N_{BWP,A}^{size}(N_{BWP,A}^{size}+1)/2)\rceil, N_{BWP,A}^{RBG})+1$ bits is used to indicate a configured resource allocation type. For example, the bit is a most significant bit. When a value of the bit is 0, the resource allocation type is configured as the type 0; or when a value of the bit is 1, the resource allocation type is configured as the type 1. The $\max(\lceil \log_2(N_{BWP,A}^{size}(N_{BWP,A}^{size}+1)/2)\rceil, N_{BWP,A}^{RBG})+1$ bits except the bit that is used to indicate the configured resource allocation type are used to indicate an allocated frequency domain resource. For example, if the resource allocation type is the type 0, $N_{BWP,A}^{RBG}$ bits in the $\max(\lceil \log_2(N_{BWP,A}^{size}(N_{BWP,A}^{size}+1)/2)\rceil, N_{BWP,A}^{RBG})$ bits are used for resource allocation performed based on a method described by the type 0; or if the resource allocation type is the type 1, $\lceil \log_2(N_{BWP,A}^{size}(N_{BWP,A}^{size}+1)/2)\rceil$ bits in the $\max(\lceil \log_2(N_{BWP,A}^{size}(N_{BWP,A}^{size}+1)/2)\rceil, N_{BWP,A}^{RBG})$ bits are used for resource allocation performed based on a method described by the type 1. No further details are provided herein. In this case, the DCI A may further include VRB-to-PRB mapping information. For example, a size of the VRB-to-PRB mapping information is one bit, indicating, when the frequency domain resource allocation type is configured as the type 1, whether a VRB is directly mapped to a PRB or is mapped to a PRB based on interleaving in the resource allocation method. The DCI A may further include frequency-domain frequency hopping enabling indication information. For example, a size of the frequency-domain frequency hopping enabling indication information is one bit. In the embodiments of this application, the frequency-domain frequency hopping enabling indication information is used to indicate whether to enable frequency-domain frequency hopping. If the frequency-domain frequency hopping is enabled, the $\max(\lceil \log_2(N_{BWP,A}^{size}(N_{BWP,A}^{size}+1)/2)\rceil, N_{BWP,A}^{RBG})$ bits in the frequency domain resource allocation indication may include $N_{hop}$ bits used to indicate a frequency hopping offset, and an information bit in the $\max(\lceil \log_2(N_{BWP,A}^{size}(N_{BWP,A}^{size}+1)/2)\rceil, N_{BWP,A}^{RBG})$ bits other than the $N_{hop}$ bits or an information bit in the $\lceil \log_2(N_{BWP,A}^{size}(N_{BWP,A}^{size}+1)/2)\rceil$ bits in the $\max(\lceil \log_2(N_{BWP,A}^{size}(N_{BWP,A}^{size}+1)/2)\rceil, N_{BWP,A}^{RBG})$ bits other than the $N_{hop}$ bits is used to indicate an index of a start RB and a quantity of consecutively allocated RBs. Optionally, one bit used to indicate the VRB-to-PRB mapping information may be the same as the one bit used to indicate frequency-domain frequency hopping enabling.

As described above, when BWP switching or cross-BWP scheduling is performed, if both the first DCI and the second DCI include a resource allocation indication, a size of the resource allocation indication in the first DCI is determined based on a bandwidth of the first BWP and a configured resource allocation type, and a size of the resource allocation indication in the second DCI is determined based on a bandwidth of the second BWP and a configured resource allocation type, the size of the resource allocation indication in the first DCI may be less than that of the information field in the second DCI, that is, the resource allocation indication in the first DCI is truncated information. The following details how BWP switching or cross-BWP resource allocation is performed by using the $L_f$-bit truncated frequency domain resource allocation indication. The $L_f$-bit truncated frequency domain resource allocation indication may also be referred to as an $L_f$-bit frequency domain resource allocation indication.

Figure 4:
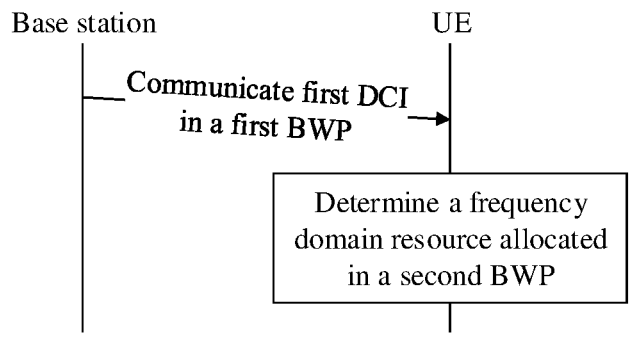
FIG. 4 is a flowchart of a downlink control information transmission method according to an embodiment of this application.

FIG. 4 shows a downlink control information transmission method. As shown in FIG. 4, a base station sends first DCI to UE in search space of a first BWP, where the first DCI includes a frequency domain resource allocation indication, and the frequency domain resource allocation indication is used to indicate a frequency domain resource allocated to the UE in a second BWP. The UE receives the first DCI, and determines, based on the frequency domain resource allocation indication in the first DCI, the frequency domain resource allocated to the UE in the second BWP.

A size of the frequency domain resource allocation indication in the first DCI is less than that of a frequency domain resource allocation indication in second DCI. Alternatively, when a resource allocation type configured for the first BWP is a type 0 and a resource allocation type configured for the second BWP is a type 1 (or a type 0 and a type 1), a size of the frequency domain resource allocation indication in the first DCI is less than a sum of a size of the frequency domain resource allocation indication in the second DCI and a size of a VRB-to-PRB mapping indication and/or a size of a frequency-domain frequency hopping enabling indication. Alternatively, when a resource allocation type configured in the first BWP is a type 1 (or a type 0 and a type 1) and a resource allocation type configured in the second BWP is a type 0, a sum of a size of the frequency domain resource allocation indication in the first DCI and a size of a VRB-to-PRB mapping indication and/or a size of a frequency-domain frequency hopping enabling indication is less than a size of the frequency domain resource allocation indication in the second DCI. The second DCI is used to schedule a resource to the UE in search space of the second BWP, and the frequency domain resource allocation indication in the second DCI is used to indicate a frequency domain resource allocated to the UE in the second BWP.

Scenario 1: Frequency Domain Resource Allocation Type of the Second BWP being the Type 0

Optionally, $L_f$ bits in the first DCI that are used for frequency domain resource allocation may also be referred to as an $L_f$-bit bitmap, and bits in the $L_f$-bit bitmap in descending order are respectively corresponding to an RBG 0 to an RBG ($L_f$−1) in the second BWP. For one bit in the $L_f$-bit bitmap, when a value of the bit is t1, a resource allocated by the base station to the UE includes one RBG corresponding to the bit; or when a value of the bit is t2 or is not t1, a resource allocated by the base station to the UE does not include one RBG corresponding to the bit. t1 and t2 may be integers. For example, t1 is 1. Optionally, the $L_f$ bits in the first DCI that are used for frequency domain resource allocation may be the frequency domain resource allocation indication in the first DCI, or may be the sum of the size of the frequency domain resource allocation indication in the first DCI and the size of the VRB-to-PRB mapping indication and/or the size of the frequency-domain frequency hopping enabling indication.

Scenario 2: Frequency Domain Resource Allocation Type of the Second BWP being the Type 1

For example, if the frequency domain resource allocation type of the first BWP is the type 0, an $L_f$-bit frequency domain resource allocation indication in the first DCI is used to indicate an index of a start RB allocated by the base station to the UE in the second BWP and a quantity of RBs consecutively allocated by the base station to the UE in the second BWP. In this case, a VRB-to-PRB mapping manner may be preconfigured for resource allocation corresponding to the first DCI. For example, direct VRB-to-PRB mapping is preconfigured. Whether frequency-domain frequency hopping is enabled may further be preconfigured for resource allocation corresponding to the first DCI. For example, that frequency-domain frequency hopping is not enabled is preconfigured. In other words, the first DCI may not include VRB-to-PRB mapping information and/or frequency hopping enabling indication information.

For example, if the frequency domain resource allocation type of the first BWP is the type 0, an $L_f$-bit frequency domain resource allocation indication in the first DCI includes K-bit information, where the K-bit information is VRB-to-PRB mapping information and/or frequency-domain frequency hopping enabling indication information, and K=1 or K=2. For example, the K-bit information has K most significant bits, K least significant bits, or K bits including $K_1$ most significant bits and $K_2$ least significant bits in the $L_f$-bit frequency domain resource allocation indication, where $K_1+K_2=K$. Remaining ($L_f$−K)-bit information in the $L_f$-bit frequency domain resource allocation indication is used to indicate the index of the start RB allocated by the base station to the UE in the second BWP and the quantity of RBs consecutively allocated by the base station to the UE in the second BWP.

For example, if the frequency domain resource allocation type of the first BWP is the type 1, $L_f$ bits in the first DCI that are used for frequency domain resource allocation are used to indicate the index of the start RB allocated by the base station to the UE in the second BWP and the quantity of RBs consecutively allocated by the base station to the UE in the second BWP. Optionally, the $L_f$ bits in the first DCI that are used for frequency domain resource allocation may be the frequency domain resource allocation indication in the first DCI, or may be the sum of the size of the frequency domain resource allocation indication in the first DCI and the size of the VRB-to-PRB mapping indication and/or the size of the frequency-domain frequency hopping enabling indication.

After receiving the first DCI, the UE determines, based on the first DCI, the frequency domain resource allocated to the UE in the second BWP. For example, after receiving an RIV, the UE determines, based on $x = \lfloor RIV/N_{BWP,B}^{size} \rfloor + RIV \bmod N_{BWP,B}^{size}$ and a quantity $N_{BWP,B}^{size}$ of RBs in the second BWP, an index $RB_{start}$ of the start RB allocated by the base station to the UE in the second BWP and a quantity $L_{RBs}$ of RBs consecutively allocated by the base station to the UE in the second BWP. For example, if $x < N_{BWP,B}^{size}$, $L_{RBs}-1 \leq \lfloor N_{BWP,B}^{size}/2 \rfloor$, $RB_{start}=RIV \bmod N_{BWP,B}^{size}$, and $L_{RBs}=\lfloor RIV/N_{BWP,B}^{size} \rfloor + 1$. if $x \geq N_{BWP,B}^{size}$, $L_{RBs}-1 > \lfloor N_{BWP,B}^{size}/2 \rfloor$, $RB_{start}=N_{BWP,B}^{size}-RIV \bmod N_{BWP,B}^{size}-1$, and $L_{RBs}=N_{BWP,B}^{size}-\lfloor RIV/N_{BWP,B}^{size} \rfloor + 1$.

Scenario 3: Frequency Domain Resource Allocation Type of the Second BWP being the Type 0 and the Type 1

For example, the frequency domain resource allocation type of the second BWP is preconfigured as the type 0, an $L_f$-bit frequency domain resource allocation indication in the first DCI may also be referred to as an $L_f$-bit bitmap, and $\min\{L_f, N_{BWP,2}^{RBG}\}$ bit in the $L_f$-bit bitmap in descending order are respectively corresponding to an RBG 0 to an RBG $\min\{L_f, N_{BWP,2}^{RBG}\}-1$ in the second BWP. For one bit in the $\min\{L_f, N_{BWP,2}^{RBG}\}$ bits, when a value of the bit is t1, a resource allocated by the base station to the UE includes one RBG corresponding to the bit; or when a value of the bit is t2 or is not t1, a resource allocated by the base station to the UE does not include one RBG corresponding to the bit. $N_{BWP,2}^{RBG}$ is a quantity of RBGs included in the second BWP, and t1 and t2 may be integers. For example, t1 is 1.

For example, if the frequency domain resource allocation type of the first BWP is the type 0, the frequency domain resource allocation type of the second BWP is the type 0, an $L_f$-bit frequency domain resource allocation indication in the first DCI may also be referred to as an $L_f$-bit bitmap, and $\min\{L_f, N_{BWP,2}^{RBG}\}$ bits in the $L_f$-bit bitmap in descending order are respectively corresponding to an RBG 0 to an RBG $\min\{L_f, N_{BWP,2}^{RBG}\}-1$ in the second BWP. For one bit in the $\min\{L_f, N_{BWP,2}^{RBG}\}$ bits, when a value of the bit is t1, a resource allocated by the base station to the UE includes one RBG corresponding to the bit; or when a value of the bit is t2 or is not t1, a resource allocated by the base station to the UE does not include one RBG corresponding to the bit. $N_{BWP,2}^{RBG}$ is a quantity of RBGs included in the second BWP, and t1 and t2 may be integers. For example, t1 is 1.

For example, if the frequency domain resource allocation type of the first BWP is the type 1, the frequency domain resource allocation type of the second BWP is the type 1, and an $L_f$-bit frequency domain resource allocation indication in the first DCI is used to indicate an index of a start RB allocated by the base station to the UE in the second BWP and a quantity of RBs consecutively allocated by the base station to the UE in the second BWP. After receiving the first DCI, the UE determines, based on the first DCI, the frequency domain resource allocated to the UE in the second BWP. A method for determining the frequency domain resource is similar to corresponding descriptions in the scenario 2. No further details are provided herein.

For example, $L_f$ bits in the first DCI that are used for frequency domain resource allocation include 1-bit information used to indicate the resource allocation type that is configured for the second BWP by using the first DCI. For example, when a value of the bit is 0, the resource allocation type is configured as the type 0; or when a value of the bit is 1, the resource allocation type is configured as the type 1. The following provides more details.

When the resource allocation type that is configured for the second BWP by using the first DCI is the type 0, remaining ($L_f$-1) bits may also be referred to as an ($L_f$-1)-bit bitmap, and $\min\{L_f-1, N_{BWP,2}^{RBG}\}$ bits in the ($L_f$-1) bits in descending order are respectively corresponding to an RBG 0 to an RBG $\min\{L_f-1, N_{BWP,2}^{RBG}\}$-1 in the second BWP. For one bit in the $\min\{L_f-1, N_{BWP,2}^{RBG}\}$ bits, when a value of the bit is t1, a resource allocated by the base station to the UE includes one RBG corresponding to the bit; or when a value of the bit is t2 or is not t1, a resource allocated by the base station to the UE does not include one RBG corresponding to the bit. $N_{BWP,2}^{RBG}$ is a quantity of RBGs included in the second BWP, and t1 and t2 may be integers. For example, t1 is 1. Optionally, the $L_f$ bits in the first DCI that are used for frequency domain resource allocation may be the frequency domain resource allocation indication in the first DCI, or may be the sum of the size of the frequency domain resource allocation indication in the first DCI and the size of the VRB-to-PRB mapping indication and/or the size of the frequency-domain frequency hopping enabling indication. Optionally, the $L_f$ bits in the first DCI that are used for frequency domain resource allocation may be a frequency domain resource allocation indication in third DCI, or may be a sum of a size of the frequency domain resource allocation indication in the third DCI and the size of the VRB-to-PRB mapping indication and/or the size of the frequency-domain frequency hopping enabling indication. The third DCI is used for scheduling corresponding to the first BWP in the search space of the first BWP.

When the resource allocation type that is configured for the second BWP by using the first DCI is the type 1, remaining ($L_f$-1) bits are used to indicate the index of the start RB allocated by the base station to the UE in the second BWP and the quantity of RBs consecutively allocated by the base station to the UE in the second BWP. After receiving the first DCI, the UE determines, based on the first DCI, the frequency domain resource allocated to the UE in the second BWP. A method for determining the frequency domain resource is similar to corresponding descriptions in the scenario 2. No further details are provided herein. If the frequency domain resource allocation type of the first BWP is the type 0, a VRB-to-PRB mapping manner may be preconfigured for resource allocation corresponding to the first DCI. For example, direct VRB-to-PRB mapping is preconfigured. Whether frequency-domain frequency hopping is enabled may further be preconfigured for resource allocation corresponding to the first DCI. For example, that frequency-domain frequency hopping is not enabled is preconfigured. In other words, the first DCI may not include VRB-to-PRB mapping information and/or frequency hopping enabling indication information.

For example, $L_f$ bits in the first DCI that are used for frequency domain resource allocation include 1-bit information used to indicate the resource allocation type that is configured for the second BWP by using the first DCI. For example, when a value of the bit is 0, the resource allocation type is configured as the type 0; or when a value of the bit is 1, the resource allocation type is configured as the type 1. The $L_f$ bits in the first DCI that are used for frequency domain resource allocation further include K-bit information, where the K-bit information is VRB-to-PRB mapping information and/or frequency-domain frequency hopping enabling indication information, and K=1 or K=2. Optionally, the resource allocation type configured in the first BWP is the type 0. The following provides more details.

When the resource allocation type that is configured for the second BWP by using the first DCI is the type 0, remaining ($L_f$-K-1) bits may also be referred to as an ($L_f$-K-1)-bit bitmap, and $\min\{L_f-K-1, N_{BWP,2}^{RBG}\}$ bits in the ($L_f$-k-1) bits in descending order are respectively corresponding to an RBG 0 to an RBG $\min\{L_f-K-1, N_{BWP,2}^{RBG}\}$-1 in the second BWP. For one bit in the $\min\{L_f-K-1, N_{BWP,2}^{RBG}\}$ bits, when a value of the bit is t1, a resource allocated by the base station to the UE includes one RBG corresponding to the bit; or when a value of the bit is t2 or is not t1, a resource allocated by the base station to the UE does not include one RBG corresponding to the bit. $N_{BWP,2}^{RBG}$ is a quantity of RBGs included in the second BWP, and t1 and t2 may be integers. For example, t1 is 1. Optionally, the $L_f$ bits in the first DCI that are used for frequency domain resource allocation may be the frequency domain resource allocation indication in the first DCI, or may be the sum of the size of the frequency domain resource allocation indication in the first DCI and the size of the VRB-to-PRB mapping indication and/or the size of the frequency-domain frequency hopping enabling indication. Optionally, the $L_f$ bits in the first DCI that are used for frequency domain resource allocation may be a frequency domain resource allocation indication in third DCI, or may be a sum of a size of the frequency domain resource allocation indication in the third DCI and the size of the VRB-to-PRB mapping indication and/or the size of the frequency-domain frequency hopping enabling indication. The third DCI is used for scheduling corresponding to the first BWP in the search space of the first BWP.

When the resource allocation type that is configured for the second BWP by using the first DCI is the type 1, remaining ($L_f$-K-1) bits are used to indicate the index of the start RB allocated by the base station to the UE in the second BWP and the quantity of RBs consecutively allocated by the base station to the UE in the second BWP. After receiving the first DCI, the UE determines, based on the first DCI, the frequency domain resource allocated to the UE in the second BWP. A method for determining the frequency domain resource is similar to corresponding descriptions in the scenario 2. No further details are provided herein.

(b1) Time Domain Resource Allocation Indication

In the diagram of the example air interface resource shown in FIG. 3, the base station and the UE may perform data transmission based on a transmission time interval (TTI) in time domain. In the embodiments of this application, the TTI may include a positive integer of time units, and the time unit includes a symbol, a slot, a mini-slot, a subframe, a frame, or another time unit commonly used in the field. This is not limited in this application. In the embodiments of this application, that the TTI is a slot may be used as an example for description. For example, one slot may include 14 symbols, and indexes corresponding to the 14 symbols may be 0, 1, 2, 3, 4, 5, 6, 7, 8, 9, 10, 11, 12, and 13, respectively.

A time domain resource allocation indication in DCI may be used to indicate time domain resource allocation information. The time domain resource allocation information includes at least one of the following: a distance k1 between a slot for communicating the DCI and a slot for communicating a PUSCH corresponding to the DCI, a value indicating a start symbol and a quantity of consecutive symbols (starting and length indication value, SLIV) of the PUSCH in the slot for communicating the PUSCH corresponding to the DCI, and a PUSCH mapping type indication. k1 is measured in slots. In the embodiments of this application, a PUSCH mapping type is used to indicate a symbol occupied by a demodulation reference signal (DMRS) of the PUSCH, and the DMRS is used to demodulate the PUSCH. For example, when the PUSCH mapping type is a type A, an index of the symbol occupied by the DMRS is configured by using a broadcast message; or when the PUSCH mapping type is a type B, the symbol occupied by the DMRS is the start symbol of the PUSCH. In the embodiments of this application, for the SLIV, for example, when one slot includes 14 symbols:

if L−1≤y, SLIV=14·(L−1)+S else SLIV=14·(14−L+1)+(14−1−S)

S is an identifier or an index of the start symbol, L is a quantity of consecutive symbols, and 0<L≤14−S.

For example, if the UE receives DCI in a slot n, where the DCI is carried on a PDCCH, the UE sends a PUSCH corresponding to the DCI in a slot (n+k1). In other words, the DCI includes scheduling information corresponding to the PUSCH. In the slot (n+k1), the UE transmits, starting from the start symbol indicated by the SLIV, the PUSCH in the consecutive symbols indicated by the SLIV.

For a BWP A, when scheduling corresponding to the BWP A is performed in search space of the BWP A by using DCI A, the base station may configure a plurality of pieces of time domain resource allocation information for the UE through preconfiguration or semi-static configuration, where each piece of time domain resource allocation information is corresponding to a unique identifier. The base station may configure, for the UE by using the DCI A, one of the plurality of pieces of time domain resource allocation information that is used for communicating a PUSCH corresponding to the DCI A. In the embodiments of this application, semi-static configuration may be configuration performed by the base station for the UE by using RRC signaling, a broadcast message, a system message, or a MAC CE. For example, if the plurality of pieces of time domain resource allocation information configured by the base station for the UE are $N_{ind}$=4 pieces of information: information 0, information 1, information 2, and information 3, a time domain resource allocation indication in the DCI A may include $\lceil \log_2(N_{ind}) \rceil$=2 information bits used to indicate a specific piece of time domain resource allocation information, configured by the base station for the UE, among the information 0, the information 1, the information 2, and the information 3. For example, Table 2 lists possible values of the time domain resource allocation indication in the DCI A and time domain resource allocation information corresponding to the possible values. The time domain resource allocation information configured by the base station for the UE by using the DCI A may be determined based on Table 2 and a value of the time domain resource allocation indication in the DCI A. For example, if a value of the time domain resource allocation indication in the DCI A is 00, it may be determined that the time domain resource allocation information configured by the base station for the UE by using the DCI A is the information 0. $N_{ind}$ corresponding to an uplink may be the same as or different from $N_{ind}$ corresponding to a downlink. This is not limited in this application.

TABLE 2

| | Possible value of the time domain resource allocation indication in the DCI A | | | |
|---|---|---|---|---|
| | 00 | 01 | 10 | 11 |
| Time domain resource allocation information | Information 0 | Information 1 | Information 2 | Information 3 |

When BWP switching or cross-BWP scheduling is performed by using DCI, the base station sends first DCI to the UE in the search space of the first BWP, where the first DCI includes a time domain resource allocation indication, and the time domain resource allocation indication is used to indicate time domain resource allocation information configured for the UE in the second BWP; and the UE receives the first DCI in the search space of the first BWP, and determines, based on the time domain resource allocation indication in the first DCI, the time domain resource allocation information configured for the UE in the second BWP.

$\lceil \log_2(X) \rceil$ bits in an $L_T$-bit time domain resource allocation indication in the first DCI are used to indicate a specific piece of time domain resource allocation information, configured for the UE in the second BWP, in X pieces of time domain resource allocation information, the X pieces of time domain resource allocation information are included in $N_{BWP,2}^{TF}$ pieces of time domain resource allocation information, and the $N_{BWP,2}^{TF}$ pieces of time domain resource allocation information are candidate time domain resource allocation information corresponding to the second BWP. For example, second DCI is used to schedule a resource to the UE in the search space of the second BWP, and an $\lceil \log_2(N_{BWP,2}^{TF}) \rceil$-bit time domain resource allocation indication in the second DCI is used to indicate a specific piece of time domain resource allocation information, configured for the UE in the second BWP, in the $N_{BWP,2}^{TF}$ pieces of time domain resource allocation information. Optionally, all $L_T - \lceil \log_2(X) \rceil$ bits in the $L_T$-bit time domain resource allocation indication other than the $\lceil \log_2(X) \rceil$ bits are 0.

For example, the X pieces of time domain resource allocation information are X pieces of time domain resource allocation information with maximum timing offsets among the $N_{BWP,2}^{TF}$ pieces of time domain resource allocation information. A timing offset of time domain resource allocation information is determined based on k1 and/or an identifier s of a start symbol of a PUSCH in the time domain resource allocation information. Optionally, the timing offset may be k1, the identifier s of the start symbol of the PUSCH, or 14k1+S. By using this method, a timing offset indicated by the first DCI can satisfy a requirement of a switching latency for the UE to switch from the first BWP to the second BWP, that is, the timing offset indicated by the first DCI can be greater than or equal to the switching latency for the UE to switch from the first BWP to the second BWP. The switching latency may include at least one of a radio frequency switching time, a PDCCH processing time, and a beam preparation time.

For another example, the X pieces of time domain resource allocation information are corresponding to first X pieces of time domain resource allocation information, for example, $0^{th}$ to $(x-1)^{th}$ pieces of time domain resource allocation information, in the $N_{BWP,2}^{TF}$ pieces of time domain resource allocation information; and a timing offset corresponding to at least one piece of the X pieces of time domain resource allocation information can satisfy a requirement of a switching latency for the UE to switch from the first BWP to the second BWP, that is, the timing offset corresponding to the at least one piece of time domain resource allocation information is greater than or equal to the switching latency for the UE to switch from the first BWP to the second BWP. The switching latency may include at least one of a radio frequency switching time, a PDCCH processing time, and a beam preparation time. The timing offset is determined based on k1 and/or an identifier s of a start symbol of a PUSCH in the time domain resource allocation information. The UE assumes that the time domain resource allocation information indicated by the first DCI is one of the at least one piece of time domain resource allocation information.

(c1) DMRS Antenna Port

In the embodiments of this application, a reference signal (RS) may be communicated between the base station and the UE for channel estimation or channel sounding. The reference signal may also be referred to as a pilot or may have other names. This is not limited in this application. For example, when the base station and the UE perform communication, the RS may be communicated for channel state estimation or channel measurement. The base station and the UE may perform data transmission based on an estimated channel state or a channel measurement accordingly, so that a data transmission rate can be increased.

When sending a PUSCH to the base station, the UE may send an uplink DMRS to the base station; and the base station performs channel estimation based on the received DMRS, and demodulates the PUSCH based on a result of the channel estimation. The DMRS may be referred to as a DMRS corresponding to the PUSCH.

When performing data transmission, the base station and the UE perform data transmission through a channel. One base station and one UE may perform data transmission through at least one channel. One channel may be corresponding to one antenna port, and a signal transmitted through an antenna port may be deduced based on another signal transmitted through the antenna port. For example, the base station and the UE may communicate a DMRS and other data through an antenna port. The DMRS may be used for channel estimation, and a result of the channel estimation may be used for demodulating the other data communicated through the antenna port. In a cell, to support the base station in performing data transmission with one or more UEs through a plurality of antenna ports to increase a system capacity, a plurality of antenna ports may be configured for data transmission. An antenna port used for downlink transmission and an antenna port used for uplink transmission may be separately configured.

A plurality of DMRSs may be configured for an uplink. Each of the plurality of DMRSs may be corresponding to one antenna port, and an antenna port used for transmitting a DMRS may also be referred to as a DMRS antenna port. Further, for the plurality of DMRSs, DMRS antenna ports of the plurality of DMRSs may be grouped to obtain code division multiplexing (CDM) groups.

For example, as listed in Table 3, corresponding to a DMRS configuration type 1, a plurality of DMRS antenna ports are eight antenna ports in total: a port 0, a port 1, a port 2, a port 3, a port 4, a port 5, a port 6, and a port 7. In this case, a first CDM group (a CDM group 0) may include the port 0, the port 1, the port 4, and the port 5, and a second CDM group (a CDM group 1) may include the port 2, the port 3, the port 6, and the port 7.

TABLE 3

| Antenna port | CDM group |
| --- | --- |
| Port 0 | CDM group 0 |
| Port 1 | CDM group 0 |
| Port 2 | CDM group 1 |
| Port 3 | CDM group 1 |
| Port 4 | CDM group 0 |
| Port 5 | CDM group 0 |
| Port 6 | CDM group 1 |
| Port 7 | CDM group 1 |

For another example, as listed in Table 4, corresponding to a DMRS configuration type 2, a plurality of DMRS antenna ports are 12 antenna ports in total: a port 00, a port 01, a port 02, a port 03, a port 04, a port 05, a port 06, a port 07, a port 08, a port 09, a port 10, and a port 11. In this case, a first CDM group (a CDM group 0) may include the port 00, the port 01, the port 06, and the port 07, a second CDM group (a CDM group 1) may include the port 02, the port 03, the port 08, and the port 09, and a third CDM group (a CDM group 2) may include the port 04, the port 05, the port 10, and the port 11.

TABLE 4

| Antenna port | CDM group |
| --- | --- |
| Port 00 | CDM group 0 |
| Port 01 | CDM group 0 |
| Port 02 | CDM group 1 |
| Port 03 | CDM group 1 |
| Port 04 | CDM group 2 |
| Port 05 | CDM group 2 |
| Port 06 | CDM group 0 |
| Port 07 | CDM group 0 |
| Port 08 | CDM group 1 |
| Port 09 | CDM group 1 |
| Port 10 | CDM group 2 |
| Port 11 | CDM group 2 |

In the embodiments of this application, a DMRS type of a PUSCH may be the same as a PUSCH mapping type, a DMRS type 1 of the PUSCH is the same as a type A of the PUSCH mapping type, and a DMRS type 2 of the PUSCH is the same as a type B of the PUSCH mapping type.

For a BWP, when the base station configures a DMRS for the UE, the base station may configure a candidate DMRS configuration set through preconfiguration or semi-static configuration. One DMRS configuration in the set may include at least one of the following information: an index or an identifier corresponding to the configuration, a port number of a DMRS antenna port, a quantity of DMRS CDM groups, and a quantity of symbols to which a DMRS is mapped. The port number of the DMRS antenna port may include at least one port number, and an antenna port corresponding to the at least one port number is used for transmitting the DMRS. If the quantity of DMRS CDM groups is $N_{CDM}^{DMRS}$, a resource corresponding to DMRS antenna ports included in a CDM group 0 to a CDM group ($N_{CDM}^{DMRS}-1$) is not mapped to the PUSCH, that is, the resource corresponding to the DMRS antenna ports included in the CDM group 0 to the CDM group ($N_{CDM}^{DMRS}-1$) is not used for transmitting the PUSCH. For different BWPs, the base station may configure a separate candidate DMRS configuration set for each of the different BWPs.

For a BWP A, if the base station configures, for the UE, a candidate DMRS configuration set corresponding to the BWP, where the set includes $N^{MRS}$ DMRS configurations, when scheduling corresponding to the BWP A is performed in search space of the BWP A by using DCI A, the DCI A may include a DMRS antenna port. An information field corresponding to the DMRS antenna port includes $\log_2\lceil N_{DRMS} \rceil$ bits used to indicate a specific DMRS configuration, configured by the base station for the UE, in the $N^{DMRS}$ DMRS configurations, and is used to indicate transmission of a DMRS corresponding to a PUSCH.

The following provides examples of a candidate DMRS configuration set corresponding to the BWP A.

For example, if a waveform used for data transmission between the UE and the base station is a discrete Fourier transform spread orthogonal frequency division multiplexing (DFT-s-OFDM), when a DMRS type of a PUSCH is a type 1 and a quantity of symbols to which a DMRS is mapped is a maximum of 2, a candidate DMRS configuration set is listed in Table 5. The set includes 16 configurations in total: a configuration 0 to a configuration 15, and indexes of the 16 configurations are 0 to 15.

TABLE 5

| Configuration index | Quantity of DMRS CDM groups | Port number of a DMRS antenna port | Quantity of symbols to which a DMRS is mapped |
| --- | --- | --- | --- |
| 0 | 2 | 0 | 1 |
| 1 | 2 | 1 | 1 |
| 2 | 2 | 2 | 1 |
| 3 | 2 | 3 | 1 |
| 4 | 2 | 0 | 2 |
| 5 | 2 | 1 | 2 |
| 6 | 2 | 2 | 2 |
| 7 | 2 | 3 | 2 |
| 8 | 2 | 4 | 2 |
| 9 | 2 | 5 | 2 |
| 10 | 2 | 6 | 2 |
| 11 | 2 | 7 | 2 |
| 12 to 15 | Reserved | Reserved | Reserved |

For example, if a waveform used for data transmission between the UE and the base station is a cyclic prefix orthogonal frequency division multiplexing (CP-OFDM), when a DMRS type of a PUSCH is a type 1, a quantity of symbols to which a DMRS is mapped is a maximum of 1, and a rank of the PUSCH is 1, a candidate DMRS configuration set is listed in Table 6. The set includes eight configurations in total: a configuration 0 to a configuration 7, and indexes of the eight configurations are 0 to 7. In the embodiments of this application, the rank of the PUSCH is used to indicate a quantity of flows corresponding to PUSCH transmission. When transmitting the PUSCH, the base station and the UE may use one flow for transmitting the PUSCH, to improve PUSCH transmission robustness; or may use a plurality of flows for transmitting the PUSCH, to increase a PUSCH transmission rate.

TABLE 6

| Configuration index | Quantity of DMRS CDM groups | Port number of a DMRS antenna port |
| --- | --- | --- |
| 0 | 1 | 0 |
| 1 | 1 | 1 |
| 2 | 2 | 0 |
| 3 | 2 | 1 |
| 4 | 2 | 2 |

TABLE 6-continued

| Configuration index | Quantity of DMRS CDM groups | Port number of a DMRS antenna port |
| --- | --- | --- |
| 5 | 2 | 3 |
| 6 and 7 | Reserved | Reserved |

For example, if a waveform used for data transmission between the UE and the base station is a CP-OFDM, when a DMRS type of a PUSCH is a type 1, a quantity of symbols to which a DMRS is mapped is a maximum of 2, and a rank of the PUSCH is 1, a candidate DMRS configuration set is listed in Table 7. The set includes 16 configurations in total: a configuration 0 to a configuration 15, and indexes of the 16 configurations are 0 to 15.

TABLE 7

| Configuration index | Quantity of DMRS CDM groups | Port number of a DMRS antenna port | Quantity of symbols to which a DMRS is mapped |
| --- | --- | --- | --- |
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 2 | 0 | 2 |
| 7 | 2 | 1 | 2 |
| 8 | 2 | 2 | 2 |
| 9 | 2 | 3 | 2 |
| 10 | 2 | 4 | 2 |
| 11 | 2 | 5 | 2 |
| 12 | 2 | 6 | 2 |
| 13 | 2 | 7 | 2 |
| 14-15 | Reserved | Reserved | Reserved |

For example, if a waveform used for data transmission between the UE and the base station is a CP-OFDM, when a DMRS type of a PUSCH is a type 2, a quantity of symbols to which a DMRS is mapped is a maximum of 1, and a rank of the PUSCH is 1, a candidate DMRS configuration set is listed in Table 8. The set includes 16 configurations in total: a configuration 0 to a configuration 15, and indexes of the 16 configurations are 0 to 15.

TABLE 8

| Configuration index | Quantity of DMRS CDM groups | Port number of a DMRS antenna port |
| --- | --- | --- |
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 3 | 0 |
| 7 | 3 | 1 |
| 8 | 3 | 2 |
| 9 | 3 | 3 |
| 10 | 3 | 4 |
| 11 | 3 | 5 |
| 12 to 15 | Reserved | Reserved |

For example, if a waveform used for data transmission between the UE and the base station is a CP-OFDM, when a DMRS type of a PUSCH is a type 2, a quantity of symbols to which a DMRS is mapped is a maximum of 2, and a rank of the PUSCH is 1, a candidate DMRS configuration set is listed in Table 9. The set includes 32 configurations in total: a configuration 0 to a configuration 31, and indexes of the 32 configurations are 0 to 31.

TABLE 9

| Configuration index | Quantity of DMRS CDM groups | Port number of a DMRS antenna port | Quantity of symbols to which a DMRS is mapped |
| --- | --- | --- | --- |
| 0 | 1 | 0 | 1 |
| 1 | 1 | 1 | 1 |
| 2 | 2 | 0 | 1 |
| 3 | 2 | 1 | 1 |
| 4 | 2 | 2 | 1 |
| 5 | 2 | 3 | 1 |
| 6 | 3 | 0 | 1 |
| 7 | 3 | 1 | 1 |
| 8 | 3 | 2 | 1 |
| 9 | 3 | 3 | 1 |
| 10 | 3 | 4 | 1 |
| 11 | 3 | 5 | 1 |
| 12 | 3 | 0 | 2 |
| 13 | 3 | 1 | 2 |
| 14 | 3 | 2 | 2 |
| 15 | 3 | 3 | 2 |
| 16 | 3 | 4 | 2 |
| 17 | 3 | 5 | 2 |
| 18 | 3 | 6 | 2 |
| 19 | 3 | 7 | 2 |
| 20 | 3 | 8 | 2 |
| 21 | 3 | 9 | 2 |
| 22 | 3 | 10 | 2 |
| 23 | 3 | 11 | 2 |
| 24 | 1 | 0 | 2 |
| 25 | 1 | 1 | 2 |
| 26 | 1 | 6 | 2 |
| 27 | 1 | 7 | 2 |
| 28-31 | Reserved | Reserved | Reserved |

In actual application, for the BWP A, a candidate DMRS configuration set configured by the base station for the UE may alternatively be different from examples listed in Table 5 to Table 9. For example, the candidate DMRS configuration set may alternatively be a candidate DMRS configuration set used when the rank of the PUSCH is 2, 3, or 4. The base station may configure the candidate DMRS configuration set corresponding to the BWP A through preconfiguration or semi-static configuration.

In a possible implementation, when BWP switching or cross-BWP scheduling is performed by using DCI, the base station sends first DCI to the UE in the search space of the first BWP, where the first DCI includes a DMRS antenna port indication, and the DMRS antenna port indication is used to indicate a DMRS configuration configured for the UE in the second BWP. The UE receives the first DCI in the search space of the first BWP, and determines, based on the DMRS antenna port indication in the first DCI, the DMRS configuration configured for the UE in the second BWP. $\lceil \log_2(Y) \rceil$ bits in an $L_{DMRS}^{UL}$-bit DMRS antenna port indication in the first DCI are used to indicate a specific DMRS configuration, configured for the UE in the second BWP, in Y DMRS configurations, the Y DMRS configurations are included in $N_{BWP,2}^{UL,DMRS}$ DMRS configurations, and the $N_{BWP,2}^{UL,DMRS}$ DMRS configurations are candidate DMRS configurations corresponding to the second BWP. Optionally, all $L_{DMRS}^{UL} - \lceil \log_2(Y) \rceil$ bits in the $L_{DMRS}^{UL}$-bit DMRS antenna port indication in the first DCI other than the $\lceil \log_2(Y) \rceil$ bits are 0. Y and $N_{BWP,2}^{UL,DMRS}$ are positive integers. Further, a rank corresponding to the DMRS configuration in the Y DMRS configurations is 1 or 2. To be specific, an antenna port used for transmitting a DMRS is a single antenna port or dual antenna ports, and a quantity of corresponding antenna ports is 1 or 2.

For example, a size of a DMRS antenna port indication in second DCI is $\lceil \log_2(N_{BWP,2}^{UL,DMRS}) \rceil$, the second DCI is used to schedule a resource to the UE in the search space of the second BWP, and the $\lceil \log_2(N_{BWP,2}^{UL,DMRS}) \rceil$-bit DMRS antenna port indication in the second DCI is used to indicate a specific DMRS configuration, configured for the UE in the second BWP, in the $N_{BWP,2}^{UL,DMRS}$ DMRS configurations.

For example, the Y DMRS configurations are Y DMRS configurations with a relatively small quantity of DMRS CDM groups among the $N_{BWP,2}^{UL,DMRS}$ DMRS configurations. Optionally, the Y DMRS configurations with a relatively small quantity of DMRS CDM groups are corresponding to one DMRS CDM group and/or two DMRS CDM groups. The Y DMRS configurations may alternatively be corresponding Y DMRS configurations with a relatively small quantity of symbols to which the DMRS is mapped among the $N_{BWP,2}^{UL,DMRS}$ DMRS configurations. Optionally, the Y DMRS configurations with a relatively small quantity of symbols to which the DMRS is mapped are corresponding to one symbol to which the DMRS is mapped. The Y DMRS configurations may alternatively be corresponding Y DMRS configurations with a relatively small quantity of DMRS CDM groups and a relatively small quantity of symbols to which the DMRS is mapped among the $N_{BWP,2}^{UL,DMRS}$ DMRS configurations. Optionally, the Y DMRS configurations with a relatively small quantity of DMRS CDM groups are corresponding to one DMRS CDM group and/or two DMRS CDM groups, and the Y DMRS configurations with a relatively small quantity of symbols to which the DMRS is mapped are corresponding to one symbol to which the DMRS is mapped. For another example, the Y DMRS configurations are corresponding first Y DMRS configurations among the $N_{BWP,2}^{UL,DMRS}$ DMRS configurations, or the Y DMRS configurations are corresponding to $0^{th}$ to $(Y-1)^{th}$ DMRS configurations in the $N_{BWP,2}^{UL,DMRS}$ DMRS configurations, and at least one of the Y DMRS configurations is corresponding to a relatively small quantity of DMRS CDM groups and/or a relatively small quantity of symbols to which the DMRS is mapped. For example, the quantity of DMRS CDM groups is 1 and/or 2, and the quantity of symbols to which the DMRS is mapped is 1. The UE assumes that the DMRS configuration indicated by the first DCI is one of the at least one DMRS configuration. Further, a rank corresponding to the DMRS configuration in the Y DMRS configurations is 1 or 2. To be specific, an antenna port used for transmitting the DMRS is a single antenna port or dual antenna ports, and a quantity of corresponding antenna ports is 1 or 2.

In another possible implementation, when BWP switching or cross-BWP scheduling is performed by using DCI, a preset DMRS antenna port configuration is used for transmitting a DMRS. For example, at least one of the following is preconfigured: corresponding to the DMRS configuration, a quantity of DMRS antenna ports is 1, a quantity of symbols to which a DMRS is mapped is 1, and a DMRS type is a type 1. In this case, it may be considered that the DMRS antenna port indication included in the first DCI is meaningless. In other words, the UE does not interpret the DMRS antenna port indication.

According to the foregoing method, a requirement for a rank of a PUSCH can be satisfied. When BWP switching or cross-BWP scheduling is performed, it is possible that the base station and the UE do not determine channel state information in the second BWP, or do not determine timely and accurate channel state information in the second BWP. Consequently, multiflow transmission is difficult to enable during BWP switching or cross-BWP scheduling. In this case, the foregoing method can be used to assume that both the base station and the UE need a relatively small rank, to ensure data transmission robustness during BWP switching or cross-BWP scheduling.

(d1) Precoding Information and a Layer Quantity

When performing data transmission, for example, performing PUSCH transmission, the base station and the UE may communicate data of X2 layers through X1 antenna ports, where X1 and X2 are positive integers. Optionally, X1 is greater than or equal to X2. When the data of the X2 layers is transmitted through the X1 antenna ports, the data of the X2 layers may be mapped to the X1 antenna ports by using a precoding matrix, to obtain data to be transmitted through each antenna port. When the data of the X2 layers is mapped to the X1 antenna ports by using the precoding matrix, the precoding matrix may be multiplied by the data of the X2 layers, to obtain data to be transmitted through the X1 antenna ports. A codebook w may be configured as the precoding matrix, and the codebook may be a codebook in a candidate codebook set. A quantity X2 of layers may be equal to the rank of the PUSCH.

For example, if a waveform used for uplink data transmission between the base station and the UE is a DFT-s-OFDM, and data of one layer is transmitted through four antenna ports, codebooks in the candidate codebook set may be listed in Table 10. In the embodiments of this application, an index of the codebook used as the precoding matrix may be referred to as a transmission precoding matrix indicator (TPMI).

TABLE 10

| Codebook indexes | Codebooks W (from left to right, respectively corresponding to codebook indexes on the left column) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

For another example, if a waveform used for uplink data transmission between the base station and the UE is a CP-OFDM, and data of one layer is transmitted through four antenna ports, codebooks in the candidate codebook set may be listed in Table 11.

TABLE 11

| Codebook indexes | Codebooks W (from left to right, respectively corresponding to codebook indexes on the left column) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |

TABLE 11-continued

| Codebook indexes | Codebooks W (from left to right, respectively corresponding to codebook indexes on the left column) |
|---|---|
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

For another example, if the base station and the UE perform uplink data transmission, and data of one layer is transmitted through two antenna ports, codebooks in the candidate codebook set may be listed in Table 12.

TABLE 12

| Codebook indexes | Codebooks W (from left to right, respectively corresponding to codebook indexes on the left column) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

For a BWP, in respect of a PUSCH, when configuring precoding information and a layer quantity for the UE, the base station may configure a candidate precoding information-layer quantity configuration set through preconfiguration or semi-static configuration. A precoding information-layer quantity configuration in the set may indicate at least one of the following information: an index or an identifier, a layer quantity (layer(s)), and a TPMI that are corresponding to the configuration. For different BWPs, the base station may configure a separate candidate precoding information-layer quantity configuration set for each of the different BWPs. A candidate precoding information-layer quantity configuration set may be separately configured for each of the following three scenarios: a scenario 1 related to a fully-coherent codebook, a partially-coherent codebook, and a non-coherent codebook; a scenario 2 related to a partially-coherent codebook and a non-coherent codebook; a scenario 3 related to a non-coherent codebook. The fully-coherent codebook means that a data flow is mapped to all antenna ports, and all columns of a precoding matrix in the fully-coherent codebook are non-zero elements. The partially-coherent codebook means that a data flow is mapped to some antenna ports, and each column of a precoding matrix in the partially-coherent codebook has at least one zero element and more than one non-zero element. Each column of a precoding matrix in the non-coherent codebook has only one non-zero element. Optionally, UE supporting the fully-coherent codebook also supports the partially-coherent codebook and the non-coherent codebook, and UE supporting the partially-coherent codebook also supports the non-coherent codebook.

For a BWP A, if the base station configures, for the UE, a candidate precoding information-layer quantity configuration set that is corresponding to the BWP, where the set includes $N^{PM}$ precoding information-layer quantity configurations, when scheduling corresponding to the BWP A is performed in search space of the BWP A by using DCI A, the DCI A may include precoding information and a layer quantity. An information field corresponding to the precoding information and the layer quantity includes $\log_2 \lceil N^{PM} \rceil$ bits used to indicate a specific precoding information-layer quantity configuration, configured by the base station for the UE, in the $N^{PM}$ precoding information-layer quantity configurations, and is used to indicate PUSCH transmission.

The following provides examples of a candidate precoding information-layer quantity configuration set that is corresponding to the BWP A.

An example 1 of a candidate precoding information-layer quantity configuration set is: In a scenario in which the UE uses four antenna ports, if a waveform used for data transmission between the UE and the base station is a CP-OFDM, or if a waveform used for data transmission between the UE and the base station is a CP-OFDM and a rank of a PUSCH is a maximum of 1, 2, 3, or 4, the candidate precoding information-layer quantity configuration set includes precoding information-layer quantity configurations in the second row to the fifth row in Table 13, that is, precoding information-layer quantity configurations that are corresponding to an index 0 to an index 3.

An example 2 of a candidate precoding information-layer quantity configuration set is: In a scenario in which the UE uses four antenna ports, if a waveform used for data transmission between the UE and the base station is a CP-OFDM, or if a waveform used for data transmission between the UE and the base station is a CP-OFDM and a rank of a PUSCH is a maximum of 1, 2, 3, or 4, the candidate precoding information-layer quantity configuration set includes precoding information-layer quantity configurations in the second row to the seventeenth row in Table 13, that is, precoding information-layer quantity configurations that are corresponding to an index 0 to an index 15.

An example 3 of a candidate precoding information-layer quantity configuration set is: In a scenario in which the UE uses four antenna ports, if a waveform used for data transmission between the UE and the base station is a DFT-s-OFDM, or if a waveform used for data transmission between the UE and the base station is a CP-OFDM and a rank of a PUSCH is a maximum of 1, 2, 3, or 4, the candidate precoding information-layer quantity configuration set includes precoding information-layer quantity configurations in the second row to the thirty-third row in Table 13, that is, precoding information-layer quantity configurations that are corresponding to an index 0 to an index 31.

TABLE 13

| Configuration index | Layer quantity (layer(s)) and TPMI (fully-coherent, partially-coherent, and non-coherent codebooks) | Configuration index | Layer quantity (layer(s)) and TPMI (partially-coherent and non-coherent codebooks) | Configuration index | Layer quantity (layer(s)) and TPMI (non-coherent codebook) |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| 2 | 1 layer: TPMI = 2 | 2 | 1 layer: TPMI = 1 | 2 | 1 layer: TPMI = 1 |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| 5 | 2 layers: TPMI = 1 | . . . | 2 layers: TPMI = 1 | . . . | 2 layers: TPMI = 1 |
| 6 | 2 layers: TPMI = 2 | 6 | 2 layers: TPMI = 2 | 6 | 2 layers: TPMI = 2 |
| 7 | 2 layers: TPMI = 3 | 7 | 2 layers: TPMI = 3 | 7 | 2 layers: TPMI = 3 |
| 8 | 2 layers: TPMI = 4 | 8 | 2 layers: TPMI = 4 | 8 | 2 layers: TPMI = 4 |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | Reserved |
| 13 | 1 layer: TPMI = 5 | 13 | 1 layer: TPMI = 5 | 13 | 1 layer: TPMI = 5 |
| 14 | 1 layer: TPMI = 6 | 14 | 1 layer: TPMI = 6 | 14 | 1 layer: TPMI = 6 |
| 15 | 1 layer: TPMI = 7 | 15 | 1 layer: TPMI = 7 | 15 | 1 layer: TPMI = 7 |
| 16 | 1 layer: TPMI = 8 | 16 | 1 layer: TPMI = 8 | 16 | 1 layer: TPMI = 8 |
| 17 | 1 layer: TPMI = 9 | 17 | 1 layer: TPMI = 9 | 17 | 1 layer: TPMI = 9 |
| 18 | 1 layer: TPMI = 10 | 18 | 1 layer: TPMI = 10 | 18 | 1 layer: TPMI = 10 |
| 19 | 1 layer: TPMI = 11 | 19 | 1 layer: TPMI = 11 | | |
| 20 | 2 layers: TPMI = 6 | 20 | 2 layers: TPMI = 6 | | |
| 21-26 | 2 layers: TPMI = 7 to TPMI = 12, where TPMI = 7 to TPMI = 12 are respectively corresponding to configuration indexes 21 to 26 | 21-26 | 2 layers: TPMI = 7 to TPMI = 12, where TPMI = 7 to TPMI = 12 are respectively corresponding to configuration indexes 21 to 26 | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |

TABLE 13-continued

| Configuration index | Layer quantity (layer(s)) and TPMI (fully-coherent, partially-coherent, and non-coherent codebooks) | Configuration index | Layer quantity (layer(s)) and TPMI (partially-coherent and non-coherent codebooks) | Configuration index | Layer quantity (layer(s)) and TPMI (non-coherent codebook) |
|---|---|---|---|---|---|
| 31 | 4 layers: TPMI = 2 | 31 | 4 layers: TPMI = 2 | | |
| 32 | 1 layer: TPMI = 12 | | | | |
| 33-46 | 1 layer: TPMI = 13 to TPMI = 26, where TPMI = 13 to TPMI = 26 are respectively corresponding to configuration indexes 33 to 46 | | | | |
| 47 | 1 layer: TPMI = 27 | | | | |
| 48 | 2 layers: TPMI = 14 | | | | |
| 49-54 | 2 layers: TPMI = 15 to TPMI = 20, where TPMI = 15 to TPMI = 20 are respectively corresponding to configuration indexes 49 to 54 | | | | |
| 55 | 2 layers: TPMI = 21 | | | | |
| 56 | 3 layers: TPMI = 3 | | | | |
| 57-58 | 3 layers: TPMI = 4 and TPMI = 5, where TPMI = 4 and TPMI = 5 are respectively corresponding to configuration indexes 57 and 58 | | | | |
| 59 | 3 layers: TPMI = 6 | | | | |
| 60 | 4 layers: TPMI = 3 | | | | |
| 61 | 4 layers: TPMI = 4 | | | | |
| 62-64 | Reserved | | | | |

An example 4 of a candidate precoding information-layer quantity configuration set is: In a scenario in which the UE supports two antenna ports, if a waveform used for data transmission between the UE and the base station is a DFT-s-OFDM, or if a waveform used for data transmission between the UE and the base station is a CP-OFDM and a rank of a PUSCH is a maximum of 1 or 2, the candidate precoding information-layer quantity configuration set includes precoding information-layer quantity configurations in the second row to the fifth row in Table 14, that is, precoding information-layer quantity configurations that are corresponding to an index 0 to an index 3.

An example 5 of a candidate precoding information-layer quantity configuration set is: In a scenario in which the UE supports two antenna ports, if a waveform used for data transmission between the UE and the base station is a DFT-s-OFDM, or if a waveform used for data transmission between the UE and the base station is a CP-OFDM and a rank of a PUSCH is a maximum of 1 or 2, the candidate precoding information-layer quantity configuration set includes precoding information-layer quantity configurations in the second row to the ninth row in Table 14, that is, precoding information-layer quantity configurations that are corresponding to an index 0 to an index 7.

TABLE 14

| Configuration index | Layer quantity (layer(s)) and TPMI (fully-coherent, partially-coherent, and non-coherent) | Configuration index | Layer quantity (layer(s)) and TPMI (non-coherent) |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | Reserved | | |

In a possible implementation, when BWP switching or cross-BWP scheduling is performed by using DCI, the base station sends first DCI to the UE in the search space of the first BWP, where the first DCI includes precoding information and a layer quantity, and the precoding information and the layer quantity are used to indicate a TPMI and a layer quantity that are configured for the UE in the second BWP; and the UE receives the first DCI in the search space of the first BWP, and determines, based on the precoding information and the layer quantity in the first DCI, the TPMI and the layer quantity that are configured for the UE in the second BWP. $\lceil \log_2(Z) \rceil$ bits in $L_{PM}$ bits of precoding information and a layer quantity in the first DCI are used to indicate a specific TPMI and a specific layer quantity, configured for UE in the second BWP, in Z TPMI-layer quantity configurations, and the Z TPMI-layer quantity configurations are candidate TPMI-layer quantity configurations in the second BWP. Optionally, all $L_{PM} - \lceil \log_2(Z) \rceil$ bits in the $L_{PM}$ bits of precoding information and a layer quantity other than the $\lceil \log_2(Z) \rceil$ bits are 0. $L_{PM}$ and Z are positive integers.

For example, second DCI is used to schedule a resource to the UE in the search space of the second BWP, and $\lceil \log_2(N_{BWP,2}^{PM}) \rceil$ bits of precoding information and a layer quantity in the second DCI are used to indicate a specific TPMI and a specific layer quantity, configured for the UE in the second BWP, in $N_{BWP,2}^{PM}$ TPMI-layer quantity configurations.

For example, the Z TPMI-layer quantity configurations are corresponding Z TPMI-layer quantity configurations corresponding to a relatively small quantity of layers among $N_{BWP,2}^{PM}$ TPMI-layer quantity configurations. The $N_{BWP,2}^{PM}$ TPMI-layer quantity configurations are candidate TPMI-layer quantity configurations in the second BWP. Optionally, the Z TPMI-layer quantity configurations corresponding to a relatively small quantity of layers are corresponding to one layer and/or two layers.

For another example, the Z TPMI-layer quantity configurations are corresponding first Z configurations in the $N_{BWP,2}^{PM}$ TPMI-layer quantity configurations, or the Z TPMI-layer quantity configurations are corresponding $0^{th}$ to $(Z-1)^{th}$ configurations in the $N_{BWP,2}^{PM}$ TPMI-layer quantity configurations, and at least one of the Z TPMI-layer quantity configurations is corresponding to a relatively small quantity of layers, for example, 1 and/or 2. The UE assumes that the TPMI-layer quantity configuration that is indicated by the first DCI is one of the at least one TPMI-layer quantity configuration.

In another possible implementation, when BWP switching or cross-BWP scheduling is performed by using DCI, the base station sends first DCI to the UE in the search space of the first BWP, where the first DCI includes precoding information and a layer quantity, and the precoding information and the layer quantity are used to indicate a precoding matrix and a layer quantity that are configured for the UE in the second BWP. The UE receives the first DCI in the search space of the first BWP, and determines, based on the precoding information and the layer quantity in the first DCI, the precoding matrix and the layer quantity that are configured for the UE in the second BWP. $\lceil \log_2(L^{PMI}) \rceil$ bits in the precoding matrix and the layer quantity in the first DCI are used to indicate a specific precoding information-layer quantity configuration, configured for the UE in the second BWP, in $L^{PMI}$ precoding information-layer quantity configurations. The $L^{PMI}$ precoding information-layer quantity configurations are included in $N_{BWP,2}^{PMI}$ precoding information-layer quantity configurations, and the $N_{BWP,2}^{PMI}$ precoding information-layer quantity configurations are a candidate precoding information-layer quantity configuration in the second BWP.

For example, second DCI is used to schedule a resource to the UE in the search space of the second BWP, and $\lceil \log_2(N_{BWP,2}^{PMI}) \rceil$ bits of precoding information and layer quantity in the second DCI are used to indicate a specific precoding information-layer quantity configuration, configured for the UE in the second BWP, in the $N_{BWP,2}^{PMI}$ precoding information-layer quantity configurations.

For example, the $L^{PMI}$ precoding information-layer quantity configurations are first to $(L^{PMI}-1)^{th}$ configurations, corresponding to one layer, in the $N_{BWP,2}^{PMI}$ precoding information-layer quantity configurations.

For another example, the $L^{PMI}$ precoding information-layer quantity configurations are first to $(L^{PMI}-1)^{th}$ configurations, corresponding to one layer, in a first candidate precoding information-layer quantity configuration set, and the first candidate precoding information-layer quantity configuration set is a fallback set. For example, the fallback set may be corresponding to a relatively small rank of a PUSCH. For example, the first candidate precoding information-layer quantity configuration set includes the precoding information-layer quantity configurations in Table 14. The $N_{BWP,2}^{PMI}$ precoding information-layer quantity configurations are configurations in a second candidate precoding information-layer quantity configuration set. The first candidate precoding information-layer quantity configuration set may be the same as or different from the second candidate precoding information-layer quantity configuration set. This is not limited in this application.

For example, the $L^{PMI}$ precoding information-layer quantity configurations are first to $(L^{PMI})^{th}$ configurations, corresponding to one layer, in the $N_{BWP,2}^{PMI}$ precoding information-layer quantity configurations.

For another example, the $L^{PMI}$ precoding information-layer quantity configurations are $L^{PMI}$ precoding information-layer quantity configurations that are configured by the base station for the UE through preconfiguration or through configuration by using semi-static signaling.

According to the foregoing method, a requirement for a rank of a PUSCH can be satisfied. When BWP switching or cross-BWP scheduling is performed, it is possible that the base station and the UE do not determine channel state information in the second BWP, or do not determine timely and accurate channel state information in the second BWP. Consequently, multiflow transmission is difficult to enable during BWP switching or cross-BWP scheduling. In this case, the foregoing method can be used to assume that both the base station and the UE need a relatively small rank.

(e1) Sounding Reference Signal Resource Indicator

The base station may configure a sounding reference signal (SRS) resource for the UE. For a BWP A, the base station may configure codebook-based PUSCH transmission or non-codebook-based PUSCH transmission on the BWP A. When codebook-based PUSCH transmission is configured, $N_{BWP}^{SRS,1}$ SRS resources are configured, and the base station configures one of the $N_{BWP}^{SRS,1}$ SRS resources for the UE by using an SRS resource indicator (SRI), where the SRS resource is used to determine precoding information. When non-codebook-based PUSCH transmission is configured, $N_{BWP}^{SRS,2}$ SRS resources are configured, and the base station configures at least one of the $N_{BWP}^{SRS,2}$ SRS resources for the UE by using an SRI, where the at least one SRS resource is used by the UE to determine precoding information. Optionally, $N_{BWP}^{SRS,1}$ is less than or equal to $N_{BWP}^{SRS,2}$. For example, the UE determines a quantity of used antenna ports and the antenna port based on the indicated SRS resource. In terms of codebook-based PUSCH transmission, the UE may further determine, based on the quantity of antenna ports, a candidate precoding information-layer quantity configuration set, and determine precoding information and a layer quantity based on precoding information and a layer quantity in DCI.

For example, when BWP switching or cross-BWP scheduling is performed by using DCI, for example, when the first BWP is switched to the second BWP by using first DCI or scheduling corresponding to the second BWP is performed in the search space of the first BWP, non-codebook-based PUSCH transmission in the second BWP is preconfigured for the UE. In this case, it may be considered that the UE does not need to use precoding information and a layer quantity in the first DCI.

For example, when BWP switching or cross-BWP scheduling is performed by using DCI, if non-codebook-based PUSCH transmission is configured in the first BWP, PUSCH transmission in the second BWP indicated by the first DCI is also non-codebook-based. For example, when BWP switching or cross-BWP scheduling is performed by using DCI, the base station sends first DCI in the search space of the first BWP, where the first DCI includes an SRI. If non-codebook-based PUSCH transmission is configured in the first BWP, the SRI is used to indicate that an SRS resource configured for the UE in the second BWP is one or more SRS resources in the second BWP. For example, the SRS resource configured for the UE in the second BWP is one of the SRS resources in the second BWP.

For another example, if codebook-based PUSCH transmission is configured in the first BWP, PUSCH transmission in the second BWP indicated by the first DCI is also codebook-based. For example, when BWP switching or cross-BWP scheduling is performed by using DCI, the base station sends first DCI in the search space of the first BWP, where the first DCI includes an SRI. If codebook-based PUSCH transmission is configured in the first BWP, the SRI is used to indicate that an SRS resource configured for the UE in the second BWP is one of SRS resources in the second BWP.

For example, if non-codebook-based PUSCH transmission is configured in the first BWP, and codebook-based transmission is configured in the second BWP, $\lceil \log_2(N_{BWP,2}^{SRS,1}) \rceil$ bits in the first DCI are used to indicate a specific SRS resource, configured for the UE, in the $N_{BWP,2}^{SRS,1}$ SRS resources configured in the second BWP. $L^{SRI} - \lceil \log_2(N_{BWP,2}^{SRS,1}) \rceil$ bits in the first DCI, together with the foregoing precoding information-layer quantity configuration, may be used to indicate the precoding information and the layer quantity in the second BWP. $L^{SRI}$ is a size of an SRI in the first DCI or in third DCI, and the third DCI is used for scheduling corresponding to the first BWP in the search space of the first BWP.

For example, if codebook-based PUSCH transmission is configured in the first BWP, and non-codebook-based transmission is configured in the second BWP, the SRS resource in the second BWP may be configured by using a first joint information field. A size of the first joint information field is less than or equal to a sum of a size of precoding information and a layer quantity in third DCI and a size of an SRS resource indicator in the third DCI, or a size of the first joint information field is less than or equal to a sum of a size of precoding information and a layer quantity in the first DCI and a size of an SRS resource indicator in the first DCI. The third DCI is used for scheduling corresponding to the first BWP in the search space of the first BWP. For example, the first joint information field is used to indicate that an SRS resource configured for the UE in the second BWP is one or more of the $N_{BWP,2}^{SRS,2}$ SRS resources in the second BWP. For example, the SRS resource configured for the UE in the second BWP is one of the SRS resources in the second BWP.

(f1) CSI Request

When the base station and the UE perform data transmission, the UE may report channel state information (CSI) to the base station, where the CSI is used to determine a transmission parameter of a PDSCH or a PUSCH.

For a BWP A, when scheduling corresponding to the BWP A is performed in search space of the BWP A by using DCI A, the DCI A may include a CSI request used to enable the UE to report CSI of the BWP A to the base station, for example, used to enable the UE to aperiodically report the CSI to the base station. After receiving the DCI A, the UE reports the CSI to the base station based on the CSI request included in the DCI. For example, when the CSI request is used to enable the UE to report CSI to the base station, the CSI request may indicate a CSI resource used when the UE reports the CSI. For example, the CSI request may indicate a specific CSI resource, used when the UE reports the CSI, in at least one CSI resource. The at least one CSI resource may be configured by the base station for the UE by using semi-static signaling. For any of the at least one CSI resource, the CSI resource may include a timing offset $k_{offset}$, $k_{offset}$ may be used to indicate an interval between a slot for communicating DCI including a CSI request and a slot for communicating CSI enabled by the DCI, and the timing offset may be measured in slots. If the DCI A includes a CSI request, the UE considers that reporting of CSI by the UE to the base station is enabled. If a slot for communicating the DCI A is a slot $n_0$, when PUSCH transmission is not scheduled in the DCI A, the UE reports CSI to the base station in a slot $n_0 + k_{offset}$; or when PUSCH transmission is scheduled in the DCI A, the UE reports CSI to the base station in a slot $n_0 + k1$. $k1$ is a distance between a slot for communicating the DCI and a slot for communicating a PUSCH corresponding to the DCI, and $k1$ is measured in slots. For example, $k1$ is included in a time domain resource allocation indication in the DCI. That PUSCH transmission is not scheduled in the DCI A can be determined based on toggling of a new data indicator (NDI) in the DCI A, a predefined modulation and coding scheme (MCS) indicating retransmission, and setting a redundancy version (RV) as 0. Alternatively, that there is no PUSCH transmission during CSI reporting can be determined based on a predefined MCS indicating retransmission and a quantity of scheduled RBs.

When BWP switching or cross-BWP scheduling is performed by using DCI, the base station sends first DCI to the UE in the search space of the first BWP, where the first DCI includes a CSI request, and the CSI request is used to enable the UE to report CSI of the second BWP to the base station. The UE receives the first DCI in the search space of the first BWP, and reports the CSI of the second BWP to the base station in the second BWP based on the CSI request in the first DCI. $\lceil \log_2(V) \rceil$ bits in an $L^{CSI}$-bit CSI request in the first DCI are used to indicate a specific CSI resource, based on which the UE reports the CSI of the second BWP, in v CSI resources. The v CSI resources are included in $N_{BWP,2}^{CSI}$ CSI resources, and the $N_{BWP,2}^{CSI}$ CSI resources are included in candidate CSI resources in the second BWP. Optionally, all $L^{CSI} - \lceil \log_2(V) \rceil$ bits in the $L^{CSI}$-bit CSI request other than the $\lceil \log_2(V) \rceil$ bits are 0.

For example, second DCI is used to enable, in the second BWP, the UE to report CSI of the second BWP to the base station, and a $\lceil \log_2(N_{BWP,2}^{CSI}) \rceil$-bit CSI request in the second DCI is used to indicate a specific CSI resource, based on which the UE reports the CSI of the second BWP, in the $N_{BWP,2}^{CSI}$ CSI resources.

For example, the V CSI resources are V CSI resources with maximum $k_{offset}$ among the $N_{BWP,2}^{CSI}$ CSI resources. By using this method, a requirement of a switching latency for the UE to switch from the first BWP to the second BWP can be satisfied.

For another example, the v CSI resources are first v resources in the $N_{BWP,2}^{CSI}$ CSI resources, for example, $0^{th}$ to $(V-1)^{th}$ resources in the $N_{BWP,2}^{CSI}$ CSI resources. For example, $k_{offset}$ corresponding to at least one of the v CSI resources can satisfy a requirement of a switching latency for the UE to switch from the first BWP to the second BWP, that is, $k_{offset}$ corresponding to the CSI resource is greater than or equal to the switching latency for the UE to switch from the first BWP to the second BWP. The switching latency may include at least one of a radio frequency switching time, a PDCCH processing time, and a beam preparation time. The UE assumes that a CSI resource indicated by the first DCI is one of the at least one CSI resource. By using this method, configuring a CSI resource by the base station can satisfy the requirement of the switching latency for the UE to switch from the first BWP to the second BWP. For example, the UE assumes that when $k_{offset}$ corresponding to the CSI resource indicated by the first DCI is less than the switching latency for the UE to switch from the first BWP to the second BWP, the first DCI is also used for scheduling PUSCH transmission. According to this method, when the UE reports CSI to the base station in a slot $n_0+k1$, k1 is a distance between a slot for communicating the DCI and a slot for communicating a PUSCH corresponding to the DCI. In other words, when $k_{offset}$ is not used to determine a slot for reporting the CSI, $k_{offset}$ corresponding to a CSI resource in $L^{CSI}$ CSI resources may not be limited. When k1 is greater than or equal to the switching latency for the UE to switch from the first BWP to the second BWP, the latency requirement can be satisfied.

(2) Downlink Scheduling DCI (a2) Frequency Domain Resource Allocation

The downlink scheduling DCI may include a frequency domain resource allocation indication, used to indicate a frequency domain resource that is allocated by the base station to the UE in a downlink BWP. The BWP is a BWP indicated by a BWP indication in the DCI.

For a downlink BWP A, scheduling corresponding to the BWP A is performed in search space of the BWP A by using DCI A, and the DCI A includes a frequency domain resource allocation indication, used to indicate a frequency domain resource that is allocated by the base station to the UE in the BWP A. A corresponding resource allocation method is similar to corresponding descriptions of the uplink scheduling DCI. No further details are provided herein.

For a downlink, when BWP switching or cross-BWP scheduling is performed by using first DCI, a design of a truncated frequency domain resource allocation indication in the first DCI is similar to corresponding descriptions of the uplink scheduling DCI. No further details are provided herein.

For example, a BWP in the resource allocation method corresponding to the uplink scheduling DCI is an uplink BWP, and a BWP in the resource allocation method corresponding to the downlink DCI is a downlink BWP. For another example, if a resource allocation type is a type 1, or a type 0 and a type 1, in contrast with the frequency domain resource allocation indication in the uplink scheduling DCI, the frequency domain resource allocation indication in the downlink scheduling DCI may not include frequency-domain frequency hopping enabling indication information.

(b2) Time Domain Resource Allocation Indication

A time domain resource allocation indication in DCI may be used to indicate time domain resource allocation information. The time domain resource allocation information includes at least one of the following: a distance k0 between a slot for communicating the DCI and a slot for communicating a PDSCH corresponding to the DCI, and a value indicating a start symbol and a quantity of consecutive symbols (starting and length indication value, SLIV) of the PDSCH in the slot for transmitting the PDSCH corresponding to the DCI.

For example, if the UE receives DCI in a slot n, where the DCI is carried on a PDCCH, a PDSCH corresponding to the DCI is communicated in a slot (n+k0). In other words, the DCI includes scheduling information corresponding to the PDSCH. In the slot (n+k0), starting from the start symbol indicated by the SLIV, the PDSCH is communicated in the consecutive symbols indicated by the SLIV.

Similar to descriptions of corresponding content of the uplink scheduling DCI, for a downlink BWP A, when scheduling corresponding to the BWP A is performed in search space of the BWP A by using DCI A, the base station may configure, for the UE by using the DCI A, one of a plurality of pieces of time domain resource allocation information that is used for communicating a PDSCH corresponding to the DCI A.

For a downlink, when BWP switching or cross-BWP scheduling is performed by using first DCI, a design of a truncated time domain resource allocation indication in the first DCI is similar to corresponding descriptions of the uplink scheduling DCI. No further details are provided herein. In this method, k0 in the downlink scheduling DCI is similar to k1 in the uplink scheduling DCI, k1 is the distance between the slot for communicating the DCI and the slot for communicating the PUSCH corresponding to the DCI, and k0 is the distance between the slot for communicating the DCI and the slot for communicating the PDSCH corresponding to the DCI.

(c2) DMRS antenna port

A DMRS related to downlink scheduling DCI is a DMRS corresponding to a PDSCH, and the DMRS is used for demodulating the PDSCH. A DMRS related to uplink scheduling DCI is a DMRS corresponding to a PUSCH, and the DMRS is used for demodulating the PUSCH. A DMRS configuration for the DMRS corresponding to the PDSCH may be similar to that of the DMRS corresponding to the PUSCH. No further details are provided herein. A DMRS configuration may be separately configured for an uplink and a downlink. For example, a candidate DMRS configuration set is separately configured for the uplink and the downlink.

Information included in the DMRS configuration may also be separately configured for the uplink and the downlink.

For example, if a DMRS type of a PDSCH is a type 1 and a quantity of symbols to which a DMRS is mapped is a maximum of 2, a candidate DMRS configuration set is listed in Table 15. The set includes 32 configurations in total: a configuration 0 to a configuration 31, and indexes of the 32 configurations are 0 to 31. In the embodiments of this application, a codeword 0 is corresponding to the $1^{st}$ transport block (a transport block 0), and a codeword 1 is corresponding to the $2^{nd}$ transport block (a transport block 1).

TABLE 15

| One codeword: enabling the codeword 0, and not enabling the codeword 1 | | | | Two codewords: enabling the codeword 0, and enabling the codeword 1 | | | |
|---|---|---|---|---|---|---|---|
| Configuration index | Quantity of DMRS CDM groups | Port number of a DMRS antenna port | Quantity of symbols to which a DMRS is mapped | Configuration index | Quantity of DMRS CDM groups | Port number of a DMRS antenna port | Quantity of symbols to which a DMRS is mapped |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | Reserved | Reserved | Reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

For example, if a DMRS type of a PDSCH is a type 2 and a quantity of symbols to which a DMRS is mapped is a maximum of 1, a candidate DMRS configuration set is listed in Table 16. The set includes 32 configurations in total: a configuration 0 to a configuration 31, and indexes of the 32 configurations are 0 to 31.

TABLE 16

| One codeword: enabling the codeword 0, and not enabling the codeword 1 | | | Two codewords: enabling the codeword 0, and enabling the codeword 1 | | |
|---|---|---|---|---|---|
| Configuration index | Quantity of DMRS CDM groups | Port number of a DMRS antenna port | Configuration index | Quantity of DMRS CDM groups | Port number of a DMRS antenna port |
| 0 | 1 | 0 | 0 | 3 | 0-4 |
| 1 | 1 | 1 | 1 | 3 | 0-5 |
| 2 | 1 | 0, 1 | 2-31 | Reserved | Reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |

TABLE 16-continued

| One codeword: enabling the codeword 0, and not enabling the codeword 1 | | | Two codewords: enabling the codeword 0, and enabling the codeword 1 | | |
|---|---|---|---|---|---|
| Configuration index | Quantity of DMRS CDM groups | Port number of a DMRS antenna port | Configuration index | Quantity of DMRS CDM groups | Port number of a DMRS antenna port |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

For example, if a DMRS type of a PDSCH is a type 2 and a quantity of symbols to which a DMRS is mapped is a maximum of 2, a candidate DMRS configuration set is listed in Table 17. The set includes 64 configurations in total: a configuration 0 to a configuration 63, and indexes of the 64 configurations are 0 to 63.

TABLE 17

| One codeword: enabling the codeword 0, and not enabling the codeword 1 | | | | Two codewords: enabling the codeword 0, and enabling the codeword 1 | | | |
|---|---|---|---|---|---|---|---|
| Configuration index | Quantity of DMRS CDM groups | Configuration index | Quantity of symbols to which a DMRS is mapped | Configuration index | Quantity of DMRS CDM groups | Configuration index | Quantity of symbols to which a DMRS is mapped |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |

TABLE 17-continued

| | One codeword: enabling the codeword 0, and not enabling the codeword 1 | | | | Two codewords: enabling the codeword 0, and enabling the codeword 1 | | |
| --- | --- | --- | --- | --- | --- | --- | --- |
| Configuration index | Quantity of DMRS CDM groups | Configuration index | Quantity of symbols to which a DMRS is mapped | Configuration index | Quantity of DMRS CDM groups | Configuration index | Quantity of symbols to which a DMRS is mapped |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

In a possible implementation, when BWP switching or cross-BWP scheduling is performed by using DCI, the base station sends first DCI to the UE in the search space of the first BWP, where the first DCI includes a DMRS antenna port indication, and the DMRS antenna port indication is used to indicate a DMRS configuration configured for the UE in the second BWP. The UE receives the first DCI in the search space of the first BWP, and determines, based on the DMRS antenna port indication in the first DCI, the DMRS configuration configured for the UE in the second BWP. $\lceil \log_2(Y_D) \rceil$ bits in an $L_{DMRS}^{DL}$-bit DMRS antenna port indication in the first DCI are used to indicate a specific DMRS configuration, configured for the UE in the second BWP, in $Y_D$ DMRS configurations, the $Y_D$ DMRS configurations are included in $N_{BWP,2}^{DL,DMRS}$ DMRS configurations, and the $N_{DWP,2}^{DL,DMRS}$ DMRS configurations are candidate DMRS configurations corresponding to the second BWP. Optionally, all $L_{DRMS}^{DL} - \lceil \log_2(Y_D) \rceil$ bits in the $L_{DMRS}^{DL}$-bit DMRS antenna port indication in the first DCI other than the $\lceil \log_2(Y_D) \rceil$ bits are 0. $Y_D$ and $N_{BWP,2}^{DL,DMRS}$ are positive integers.

For example, a size of a DMRS antenna port indication in second DCI is $\lceil \log_2(N_{BWP,2}^{DL,DMRS}) \rceil$, the second DCI is used to schedule a resource to the UE in the search space of the second BWP, and the $\lceil \log_2(N_{BWP,2}^{DL,DMRS}) \rceil$-bit DMRS antenna port indication in the second DCI is used to indicate a specific DMRS configuration, configured for the UE in the second BWP, in the $N_{BWP,2}^{DL,DMRS}$ DMRS configurations.

For example, the $Y_D$ DMRS configurations are $Y_D$ DMRS configurations with a relatively small quantity of DMRS CDM groups among the $N_{BWP,2}^{DL,DMRS}$ DMRS configurations. Optionally, the $Y_D$ DMRS configurations with a relatively small quantity of DMRS CDM groups are corresponding to one DMRS CDM group and/or two DMRS CDM groups. The $Y_D$ DMRS configurations may alternatively be corresponding $Y_D$ DMRS configurations with a relatively small quantity of symbols to which a DMRS is mapped among the $N_{BWP,2}^{DL,DMRS}$ DMRS configurations. Optionally, the $Y_D$ DMRS configurations with a relatively small quantity of symbols to which the DMRS is mapped are corresponding to one symbol to which the DMRS is mapped. The $Y_D$ DMRS configurations may alternatively be corresponding $Y_D$ DMRS configurations with a relatively small quantity of DMRS antenna ports among the $N_{BWD,2}^{DL,DMRS}$ DMRS configurations. Optionally, the $Y_D$ DMRS configurations may alternatively be corresponding $Y_D$ DMRS configurations with one DMRS antenna port and/or two DMRS antenna ports among the $N_{BWP,2}^{DL,DMRS}$ DMRS configurations. The $Y_D$ DMRS configurations may alternatively be corresponding $Y_D$ DMRS configurations with a relatively small quantity of DMRS antenna ports and a relatively small quantity of DMRS CDM groups among the $N_{BWP,2}^{DL,DMRS}$ DMRS configurations. Optionally, the $Y_D$ DMRS configurations may alternatively be corresponding $Y_D$ DMRS configurations with one DMRS antenna port and/or two DMRS antenna ports and one DMRS CDM group and/or two DMRS CDM groups among the $N_{BWP,2}^{DL,DMRS}$ DMRS configurations. The $Y_D$ DMRS configurations may alternatively be corresponding $Y_D$ DMRS configurations with a relatively small quantity of DMRS antenna ports and a relatively small quantity of symbols to which a DMRS is mapped among the $N_{BWP,2}^{DL,DMRS}$ DMRS configurations. Optionally, the $Y_D$ DMRS configurations may alternatively be corresponding $Y_D$ DMRS configurations with one DMRS antenna port and/or two DMRS antenna ports and one symbol to which the DMRS is mapped among the $N_{BWP,2}^{DL,DMRS}$ DMRS configurations. The $Y_D$ DMRS configurations may alternatively be corresponding $Y_D$ DMRS configurations with a relatively small quantity of DMRS CDM groups and a relatively small quantity of symbols to which a DMRS is mapped among the $N_{BWP,2}^{DL,DMRS}$ DMRS configurations. Optionally, the $Y_D$ DMRS configurations with a relatively small quantity of DMRS CDM groups are corresponding to one DMRS CDM group and/or two DMRS CDM groups, and the $Y_D$ DMRS configurations with a relatively small quantity of symbols to which the DMRS is mapped are corresponding to one symbol to which the DMRS is mapped. The $Y_D$ DMRS configurations may alternatively be corresponding $Y_D$ DMRS configurations with a relatively small quantity of DMRS antenna ports, a relatively small quantity of symbols to which a DMRS is mapped, and a relatively small quantity of DMRS CDM groups among the $N_{BWP,2}^{DL,DMRS}$ DMRS configurations. Optionally, the $Y_D$ DMRS configurations may alternatively be corresponding $Y_D$ DMRS configurations with one DMRS antenna port and/or two DMRS antenna ports, two symbols to which the DMRS is mapped, and one DMRS CDM group and/or two DMRS CDM groups among the $N_{BWP,2}^{DL,DMRS}$ DMRS configurations.

For another example, the $Y_D$ DMRS configurations are corresponding first $Y_D$ DMRS configurations among the $N_{BWP,2}^{DL,DMRS}$ DMRS configurations, or the $Y_D$ DMRS configurations are corresponding to $0^{th}$ to $(Y_D-1)^{th}$ DMRS configurations in the $N_{BWP,2}^{DL,DMRS}$ DMRS configurations, and at least one of the $Y_D$ DMRS configurations satisfies at least one of the following: corresponding to a relatively small quantity of DMRS CDM groups, corresponding to a relatively small quantity of symbols to which a DMRS is mapped, and corresponding to a relatively small quantity of DMRS antenna ports. For example, the quantity of DMRS CDM groups is 1 and/or 2, the quantity of symbols to which the DMRS is mapped is 1, and the quantity of DMRS antenna ports is 1 and/or 2. The UE assumes that the DMRS configuration indicated by the first DCI is one of the at least one DMRS configuration. Further, a rank corresponding to the DMRS configuration in the $Y_D$ DMRS configurations is 1 or 2. To be specific, an antenna port used for transmitting the DMRS is a single antenna port or dual antenna ports, and a quantity of corresponding antenna ports is 1 or 2.

In another possible implementation, when BWP switching or cross-BWP scheduling is performed by using DCI, a preset DMRS antenna port configuration is used for transmitting a DMRS. For example, at least one of the following is preconfigured: corresponding to the DMRS configuration, a quantity of DMRS antenna ports is 1, a quantity of symbols to which a DMRS is mapped is 1, and a DMRS type is a type 1. In this case, it may be considered that the DMRS antenna port indication included in the first DCI is meaningless. In other words, the UE does not interpret the DMRS antenna port indication.

According to the foregoing method, a requirement for a rank of a PDSCH can be satisfied. When BWP switching or cross-BWP scheduling is performed, it is possible that the base station and the UE do not determine channel state information in the second BWP, or do not determine timely and accurate channel state information in the second BWP. Consequently, multiflow transmission is difficult to enable during BWP switching or cross-BWP scheduling. In this case, the foregoing method can be used to assume that both the base station and the UE need a relatively small rank, to ensure data transmission robustness during BWP switching or cross-BWP scheduling.

(d2) Rate Matching Indicator

The rate matching indicator may indicate, to the UE, whether to enable a rate matching resource.

When a rate matching resource is enabled, the rate matching resource is not mapped to a PDSCH. In other words, the PDSCH is not transmitted on the rate matching resource. For example, resources configured by the base station for the UE by using the frequency domain resource allocation indication may include some or all resources A in the rate matching resource. If the rate matching resource is enabled, the base station and the UE do not communicate the PDSCH on the resources A. When the rate matching resource is not enabled, the rate matching resource may be mapped to a PDSCH. In other words, the PDSCH may be communicated on the rate matching resource.

For a BWP A, the base station may configure a plurality of rate matching resources for the UE through preconfiguration or semi-static configuration, where each rate matching resource may be corresponding to a unique identifier. The base station may enable at least one of the plurality of rate matching resources for the UE by using DCI A. The plurality of rate matching resources may be included in at least one resource group. The at least one resource group may be referred to as a resource group of the BWP, and any one of the at least one resource group may include at least one rate matching resource. A separate resource group may be configured for each of different BWPs, and resource groups of the BWPs may be identical or different. This is not limited in this application.

For a BWP A, when scheduling corresponding to the BWP A is performed in the BWP A by using DCI A, the DCI A may include a rate matching indicator, used to enable a rate matching resource in the BWP A. For example, if a rate matching resource in the BWP A includes one resource group, a size of the rate matching indicator in the DCI A may be 1 bit. When a value of the bit is 0, the rate matching resource in the resource group is enabled; or when a value of the bit is 1, the rate matching resource in the resource group is not enabled. For another example, if rate matching resources in the BWP A includes two resource groups, and the two resource groups are a resource group 0 and a resource group 1, a size of the rate matching indicator in the DCI A may be 2 bits. When a value of the two bits is 00, rate matching resources in the resource group 0 and the resource group 1 are enabled; when a value of the two bits is 01, a rate matching resource in the resource group 0 is enabled; when a value of the two bits is 10, a rate matching resource in the resource group 1 is enabled; or when a value of the two bits is 11, rate matching resources in the resource group 0 and the resource group 1 are not enabled.

For example, when BWP switching or cross-BWP scheduling is performed by using DCI, the base station sends first DCI to the UE in the search space of the first BWP, and if the first DCI does not include a rate matching indicator, the base station enables a rate matching resource in each resource group in the second BWP for the UE. The UE receives the first DCI by using the first BWP, and if the first DCI does not include a rate matching indicator, the UE considers that the rate matching resource in each resource group in the second BWP is enabled. For example, if a resource group in the second BWP include the resource group 0, and the first DCI does not include a rate matching indicator, after receiving the first DCI, the UE considers that a rate matching resource in the resource group 0 in the second BWP is enabled. For another example, if resource groups in the second BWP include the resource group 0 and the resource group 1, and the first DCI does not include a rate matching indicator, after receiving the first DCI, the UE considers that rate matching resources in the resource group 0 and the resource group 1 in the second BWP are enabled.

For another example, when BWP switching or cross-BWP scheduling is performed by using DCI, for example, when scheduling corresponding to the second BWP is performed in the search space of the first BWP by using first DCI, that the rate matching resources in the resource group 0 and the resource group 1 in the second BWP are not enabled is preconfigured; that the rate matching resources in the resource group 0 and the resource group 1 in the second BWP are enabled is preconfigured; that the rate matching resource in the resource group 0 is enabled and the rate matching resource in the resource group 1 is not enabled is preconfigured; or that the rate matching resource in the resource group 0 is not enabled and the rate matching resource in the resource group 1 is enabled is preconfigured.

For another example, when BWP switching or cross-BWP scheduling is performed by using DCI, the base station sends first DCI to the UE in the search space of the first BWP, where the first DCI includes a 1-bit rate matching indicator, used to enable a rate matching resource in a resource group in two resource groups, and the two resource groups are resource groups in the second BWP.

For example, when the value of the rate matching indicator in the first DCI is t1, it indicates that the rate matching resources in the resource group 0 and the resource group 1 in the second BWP are enabled; or when the value of the rate matching indicator in the first DCI is t2, it indicates that the rate matching resources in the resource group 0 and the resource group 1 are not enabled.

For example, when the value of the rate matching indicator in the first DCI is t1, it indicates that the rate matching resources in the resource group 0 and the resource group 1 in the second BWP are enabled; or when the value of the rate matching indicator in the first DCI is t2, it indicates that the rate matching resource in the resource group 0 is not enabled, and the rate matching resource in the resource group 1 in the second BWP is enabled.

For example, when the value of the rate matching indicator in the first DCI is t1, it indicates that the rate matching resource in the resource group 0 in the second BWP is enabled, and the rate matching resource in the resource group 1 in the second BWP is not enabled; or when the value of the rate matching indicator in the first DCI is t2, it indicates that the rate matching resources in the resource group 0 and the resource group 1 are not enabled.

For example, when the value of the rate matching indicator in the first DCI is t1, it indicates that the rate matching resource in the resource group 1 in the second BWP is enabled, and the rate matching resource in the resource group 0 in the second BWP is not enabled; or when the value of the rate matching indicator in the first DCI is t2, it indicates that the rate matching resources in the resource group 0 and the resource group 1 are not enabled.

For another example, when the value of the rate matching indicator in the first DCI is t1, it indicates that the rate matching resources in the resource group 0 and the resource group 1 in the second BWP are enabled; or when the value of the rate matching indicator in the first DCI is t2, it indicates that the rate matching resource in the resource group 0 is enabled, and the rate matching resource in the resource group 1 is not enabled. For example, t1 is equal to 0 and t2 is equal to 1. In this example, the resource group 0 and the resource group 1 are interchangeable. This is not limited.

For example, second DCI includes a 2-bit rate matching indicator, and the second DCI is used to schedule a resource to the UE in the search space of the second BWP. The rate matching indicator in the second DCI is used to enable a rate matching resource in a resource group in two resource groups, where the two resource groups are the resource group 0 and the resource group 1 in the second BWP.

For another example, when BWP switching or cross-BWP scheduling is performed by using DCI, the base station sends first DCI to the UE in the search space of the first BWP, where the first DCI includes a 1-bit rate matching indicator, and second DCI includes a 2-bit rate matching indicator. The second DCI is used to schedule a resource to the UE in the search space of the second BWP, and the rate matching indicator in the second DCI is used to enable a rate matching resource in a resource group in two resource groups. The UE ignores the rate matching indicator in the first DCI, and a rate matching resource in the second BWP is not enabled.

By using this method, the rate matching resource in the second BWP can be preferably enabled. This can avoid interference of the rate matching resource in the second BWP to PDSCH transmission, and improve robustness of data transmission in the second BWP.

(e2) Zero-Power CSI RS Resource

A function of a zero-power CSI RS resource is similar to that of a rate matching resource, the zero-power CSI RS resource is similar to the rate matching resource, and a design of enabling the zero-power CSI RS resource in the second BWP by using first DCI is similar to that of enabling the rate matching resource in the second BWP by using first DCI.

Design Scheme 2: Discarding an Information Field/Reserving Some Information Fields In the embodiments of this application, a size of DCI may be quantized as Q bits, where Q is a positive integer. For example, Q is 40, 60, 90, a positive integer less than 42, a positive integer greater than 42 and less than 83, or another positive integer. In this case, the DCI may further include a zero-padding information field, used to quantize the size of the DCI. A size (a quantity of bits) of the zero-padding information field is equal to $Q-W_{sum}$. $W_{sum}$ is a sum of sizes of information fields other than the zero-padding information field in the DCI, or a sum of quantities of bits of information fields other than the zero-padding information field in the DCI. For example, in addition to the zero-padding information field, the DCI includes U information fields. If a size (a quantity of bits) of the $i^{th}$ information field in the U information fields is $W_i$, i=0, 1, L, U-1, the size of the zero-padding information field in the DCI is $P=Q-W_{sum}=Q-\Sigma_{i=0}^{U-1}W_i$. When the size of the zero-padding information field is 0, it may be considered that the DCI does not include the zero-padding information field. In this method, the DCI may be uplink scheduling DCI or downlink scheduling DCI. A quantized value Q of the size of the DCI corresponding to the uplink scheduling DCI may be the same as or different from that corresponding to the downlink scheduling DCI. This is not limited in this application. By using this method, types of DCI sizes can be controlled, thereby reducing power consumption of detecting DCI by the UE.

When BWP switching or cross-BWP scheduling is performed by using smaller-size DCI, that is, when scheduling corresponding to the second BWP is performed in the first BWP by using the smaller-size first DCI, a size of the first DCI may be less than that of the second DCI. The size of the second DCI is determined based on the configuration of the second BWP, and specifically, a size of an information field in the second DCI is determined based on the configuration of the second BWP. In this case, in terms of an information field in the second DCI, the first DCI may not include the information field. In other words, relative to the second DCI, some information fields in the second DCI are reserved in the first DCI; or relative to the second DCI, some information fields in the second DCI are discarded for the first DCI.

Using smaller-size DCI to perform scheduling during BWP switching or cross-BWP scheduling is equivalent to using some information fields to perform scheduling during BWP switching or cross-BWP scheduling. Based on the foregoing technical issue, the following describes, specific to uplink scheduling DCI and downlink scheduling DCI, a method embodiment corresponding to the design scheme 2.

The base station sends first DCI to the UE by using the first BWP, where the first DCI is used to indicate scheduling information of the second BWP, and the first DCI includes Y 1 information fields; and the UE receives the first DCI by using the first BWP, and determines the scheduling information of the second BWP based on the first DCI. The Y 1 information fields are Y 1 information fields with relatively high priorities among Y 2 information fields, and the Y 2 information fields are included in second DCI. The second DCI is used for scheduling corresponding to the second BWP performed on the UE in the search space of the second BWP, where Y 1 and Y 2 are positive integers. Similarly, it may be considered that an information field that is included in the Y 2 information fields but is not included in the Y 1 information fields is an information field with a relatively low priority. Optionally, for a discarded information field, a value of a parameter indicated by the information field may be preconfigured, so that scheduling can be performed by using smaller-size DCI.

The following describes specific embodiments of the method based on specific content of information fields.

(a3) Discarding an Indication Information Field of a Second Transport Block

The base station sends first DCI to the UE by using the first BWP, where the first DCI is used to indicate PDSCH scheduling information of the second BWP, and the first DCI does not include an information field related to an indication of the second transport block (TB). For example, the information field related to the second TB includes at least one of an information field indicating a modulation and coding scheme (MCS), an information field indicating a new data indicator (NDI), and an information field indicating a redundancy version (RV).

Similarly, the indication information field of the second TB in this method may be replaced with an indication information field of a first TB.

By using this method, transmission of only one TB in the second BWP is enabled, so that a scheduling requirement of the second BWP can be satisfied by using smaller-size first DCI. When BWP switching or cross-BWP scheduling is performed, it is possible that the base station and the UE do not determine channel state information in the second BWP, or do not determine timely and accurate channel state information in the second BWP. Consequently, multiflow transmission is difficult to enable during BWP switching or cross-BWP scheduling, transmission of two TBs cannot be enabled, and transmission of only one TB can be enabled. In this case, discarding the information field of the second TB for the first DCI can satisfy the scheduling requirement of the second BWP.

(b3) Discarding an Indication Information Field for Code Block Group Transmission One TB may be divided into a plurality of code block groups (CBG), and each code block group includes at least one code block (CB). During CBG-based transmission, when a transmission error occurs, only some CBGs in the plurality of CBG may be retransmitted, and the entire TB does not need to be retransmitted. For CBG-based PDSCH transmission, the UE needs to feed back an acknowledgement for each CBG, and also feed back an acknowledgement for the entire TB.

The base station sends first DCI to the UE by using the first BWP, where the first DCI is used to indicate scheduling information of the second BWP, and the first DCI does not include an indication information field related to CBG-based transmission. For example, the indication information field related to CBG-based transmission includes at least one of an information field indicating a CBG index and an information field indicating whether to enable CBG-based transmission. In this case, the UE assumes that the first DCI is used for scheduling transmission or retransmission of the entire TB.

By using this method, using smaller-size first DCI can satisfy a scheduling requirement of the second BWP.

(c3) Discarding a DMRS Indication Information Field

The base station sends first DCI to the UE by using the first BWP, where the first DCI is used to indicate scheduling information of the second BWP, and the first DCI does not include a DMRS indication information field. For example, the DMRS indication information field includes at least one of an information field indicating a DMRS antenna port configuration and an information field indicating an initialization parameter used to determine a DMRS sequence. In this case, the UE uses a preset initialization parameter to determine the DMRS sequence, and uses a preset DMRS antenna port configuration to transmit a DMRS. For example, the preset DMRS antenna port configuration is corresponding to one DMRS antenna port, and the DMRS is mapped to one symbol.

(d3) Discarding a PRB Bundling Indication Information Field

The base station may configure a semi-static PRB bundling size for the UE by using semi-static signaling. The base station may further configure a PRB bundling size set for the UE by using semi-static signaling, and indicate a specific PRB bundling size, used by the UE, in the PRB bundling size set by using DCI. The base station may use semi-static signaling to indicate whether the UE uses the semi-static PRB bundling size or the UE determines the PRB bundling size based on the DCI. The UE determines a PRB bundle based on the indicated PRB bundling size, and assumes that one precoding matrix is used for the PRB bundle.

The base station sends first DCI to the UE by using the first BWP, where the first DCI is used to indicate scheduling information of the second BWP, and the first DCI does not include a PRB bundling indication information field. In this case, the UE uses the semi-static PRB bundling size to determine the PRB bundle.

In the design scheme 2, the foregoing methods in (a3)-(d3) may be combined at random. For example, the Y 1 information fields do not include at least one of an indication information field of a second TB, a CBG indication information field, a DMRS indication information field, and a PRB bundling indication information field.

In the design scheme 2, for an information field, a size of the information field in the first DCI may be equal to that of the information field in second DCI. Alternatively, a size of the information field in the first DCI may be less than that of the information field in second DCI, that is, the information field in the first DCI is a truncated information field. For an information field, when the information field in the first DCI is a truncated information field, scheduling during BWP switching or cross-BWP scheduling may be performed by using corresponding methods described in the design scheme 1 in the embodiments of this application. No further details are provided herein. For example, information field truncation may be preferably performed on an information field with a low priority. For another example, a truncation proportion of an information field may be configured based on a priority of the information field. For an information field, a truncation proportion of the information field may be $(L_2^{DCI}-L_1^{DCI})/L_2^{DCI}$, $(L_2^{DCI}-L_1^{DCI})/L_2^{DCI}$, or another value obtained through linear operation by using $L_1^{DCI}$ and $L_2^{DCI}$, where $L_1^{DCI}$ is a size of the information field in the first DCI, and $L_2^{DCI}$ is a size of the information field in the second DCI.

In the design scheme 1 or the design scheme 2, for an information field, a size of the information field in the first DCI may be equal to that of the information field in third DCI, and the third DCI is DCI for scheduling corresponding to the first BWP in the first BWP. The size of the information field in the third DCI may be determined based on the configuration of the first BWP.

Design Scheme 3: Determining Search Space Based on a DCI Type

In the embodiments of this application, for a BWP, in respect of a PDCCH, the base station may configure a plurality of search space sets for the UE by using a preconfiguration or signaling notification method. Search space set configurations of different UEs may be identical or different. This is not limited in this application. Configuration information corresponding to individual search space may include at least one of an aggregation level, a quantity of candidate resources in a candidate resource set, and a DCI size.

The aggregation level is used to indicate a size of a resource for communicating a PDCCH.

In the embodiments of this application, an aggregation level of a PDCCH may be a quantity of control channel elements (CCE) included in the PDCCH, where one CCE may include a positive integer quantity of REs. One or more aggregation levels may be configured for one search space set.

In the embodiments of this application, for a search space set, when the UE detects a PDCCH in the search space set, it is considered that an aggregation level of the PDCCH may be any aggregation level in the search space set.

The quantity of candidate resources in the candidate resource set is described as follows.

In the embodiments of this application, for an aggregation level, when the UE uses the aggregation level to detect a PDCCH in a search space set, it is considered that the PDCCH may be transmitted on any candidate resource in a candidate resource set corresponding to the aggregation level. In this case, the UE may perform blind detection on a candidate resource in the candidate resource set. For example, for a PDCCH, the UE detects the PDCCH starting from the 1st candidate resource in the candidate resource set. If the UE finds the PDCCH on a candidate resource in the candidate resource set, the UE may stop detection. The UE may detect one or more PDCCHs in one search space set.

In the embodiments of this application, for a search space set, if configuration information corresponding to the search space set includes a plurality of aggregation levels, quantities of candidate resources in candidate resource sets corresponding to different aggregation levels may be identical or different. This is not limited in this application.

The DCI size is used to indicate a size of DCI carried on a PDCCH, or is used to indicate a quantized value of DCI carried on a PDCCH. The UE uses the DCI size to detect the PDCCH.

In the embodiments of this application, for a search space set, sizes of DCI in different DCI formats may be identical or different. This is not limited in this application.

For a scenario in which a plurality of search space sets are configured, the embodiments of this application propose a method corresponding to the design scheme 3.

In the design scheme 3, for example, the UE detects first DCI and fourth DCI in one scheduling period, one slot, or one time range. The UE detects the first DCI on a first candidate resource, where the first candidate resource is included in a first candidate resource set of a PDCCH, the first candidate resource set is corresponding to a first search space set of the PDCCH, the first search space set is corresponding to a size of the first DCI, and a size of the fourth DCI is greater than that of the first DCI. The UE detects the fourth DCI on a second candidate resource, where the second candidate resource is included in a second candidate resource set of the PDCCH, the second candidate resource set is corresponding to a second search space set of the PDCCH, and the second search space set is corresponding to the size of the fourth DCI. The first search space set is corresponding to the search space of the first BWP, and the second search space set may be corresponding to the search space of the first BWP or may not be corresponding to the search space of the first BWP. This is not limited in this application. For example, the first DCI is used for scheduling a PDSCH, and the fourth DCI is used for scheduling a PUSCH. The fourth DCI may be DCI corresponding to the first BWP, DCI corresponding to the second BWP, or DCI corresponding to another BWP. This is not limited in this application. When the first DCI is used to indicate the scheduling information of the second BWP in the first search space set, and a required quantity of bits may be greater than the size of the first DCI, the UE may use the size of the fourth DCI to detect the first DCI on the second candidate resource in the second candidate resource set corresponding to the second search space set. Further, the UE may further use the size of the first DCI to detect the first DCI in the first candidate resource set corresponding to the first search space set, and use the size of the fourth DCI to detect the fourth DCI in the second candidate resource set corresponding to the second search space set.

By using this design, DCI used for BWP switching or cross-BWP scheduling is communicated on a candidate resource corresponding to larger-size DCI. This can reduce a probability that the DCI size cannot satisfy a scheduling requirement of the second BWP. Alternatively, using the second DCI to detect the first DCI and the fourth DCI in the second candidate resource set corresponding to the second search space set does not increase a maximum quantity of detection performed by the UE on a PDCCH.

Optionally, the method corresponding to the design scheme 3 may be based on the method corresponding to the design scheme 1 and/or the method corresponding to the design scheme 2. To be specific, an information field in the first DCI may be a truncated information field, and/or the first DCI is DCI in which some information fields are reserved.

In the embodiments provided in this application, the methods provided in the embodiments of this application are described from a perspective of interaction between the base station and the UE. To implement the functions in the methods provided in the embodiments of this application, the base station and the UE each may include a hardware structure and/or a software module, to implement the foregoing functions by using the hardware structure, the software module, or a combination of the hardware structure and the software module. Whether a function in the foregoing functions is performed by using a hardware structure, a software module, or a combination of a hardware structure and a software module depends on particular applications and design constraints of the technical solutions.

Figure 5:
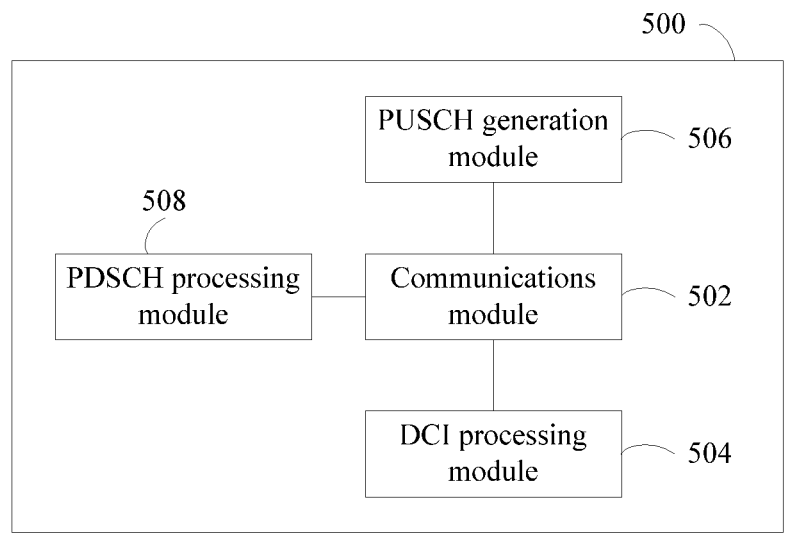
FIG. 5 is a schematic structural diagram of an apparatus according to an embodiment of this application.

FIG. 5 is a schematic structural diagram of an apparatus 500 according to an embodiment of this application. The apparatus 500 may be UE, and is capable of implementing the function of the UE in the method provided in the embodiments of this application. The apparatus 500 may alternatively be an apparatus that is capable of supporting the UE in implementing the function of the UE in the method provided in the embodiments of this application. The apparatus 500 may be a hardware structure, a software module, or a combination of a hardware structure and a software module. The apparatus 500 may be implemented by a chip system. In this embodiment of this application, the chip system may include a chip, or may include a chip and another discrete device.

As shown in FIG. 5, the apparatus 500 includes a communications module 502 and may further include a DCI processing module 505, and the communications module 502 may be coupled to the DCI processing module 504. Couplings in this embodiment of this application are indirect couplings or communication connections between apparatuses, units, or modules, may be electrical, mechanical, or in another form, and are used for information exchange between the apparatuses, the units, and the modules.

The communications module 502 is configured to receive first DCI, and the communications module 502 may further be configured to receive at least one of the following: second DCI, third DCI, and a PDSCH. The communications module 502 may further be configured to send a PUSCH. The communications module 502 is used by the apparatus 500 to communicate with another module. The another module may be a circuit, a component, an interface, a bus, a software module, a transceiver, or any other apparatus that is capable of implementing communication.

The DCI processing module 504 is configured to process the DCI received by the communications module 502. For example, the DCI processing module 504 is configured to decode the DCI received by the communications module 502. For another example, the DCI processing module 504 is configured to determine scheduling information based on the DCI received by the communications module 502.

The apparatus 500 may further include a PUSCH generation module 506, and the PUSCH generation module 506 is coupled to the communications module 502. The PUSCH generation module 506 is configured to generate the PUSCH based on uplink scheduling DCI received by the communications module 502. The uplink scheduling DCI may be at least one of the first DCI, the second DCI, and the third DCI.

The apparatus 500 may further include a PDSCH processing module 508, and the PDSCH processing module 508 is coupled to the communications module 502. The PDSCH processing module 508 is configured to decode, based on downlink scheduling DCI received by the communications module 502, the PDSCH received by the communications module 502. The downlink scheduling DCI may be at least one of the first DCI, the second DCI, and the third DCI.

Figure 6:
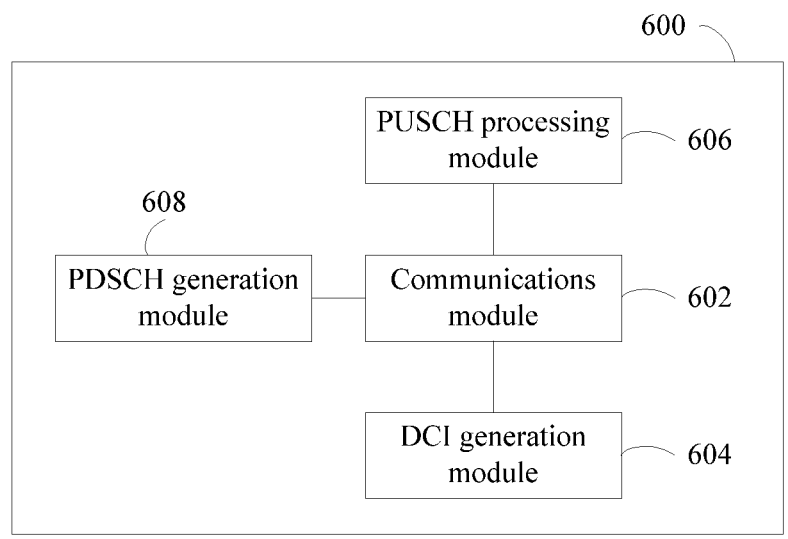
FIG. 6 is a schematic structural diagram of an apparatus according to an embodiment of this application.

FIG. 6 is a schematic structural diagram of an apparatus 600 according to an embodiment of this application. The apparatus 600 may be a base station, and is capable of implementing the function of the base station in the method provided in the embodiments of this application. The apparatus 600 may alternatively be an apparatus that is capable of supporting the base station in implementing the function of the base station in the method provided in the embodiments of this application. The apparatus 600 may be a hardware structure, a software module, or a combination of a hardware structure and a software module. The apparatus 600 may be implemented by a chip system.

As shown in FIG. 6, the apparatus 600 includes a DCI generation module 604 and a communications module 602, and the communications module 602 is coupled to the DCI generation module 604.

The DCI generation module 604 is configured to generate first DCI, and may further be configured to generate second DCI or third DCI.

The communications module 602 is configured to send the first DCI, and the communications module 602 may further be configured to send at least one of the following: the second DCI, the third DCI, and a PDSCH. The communications module 602 may further be configured to receive a PUSCH. The communications module 602 is used by the apparatus 600 to communicate with another module. The another module may be a circuit, a component, an interface, a bus, a software module, a transceiver, or any other apparatus that is capable of implementing communication.

The apparatus 600 may further include a PUSCH processing module 606, and the PUSCH processing module 606 is coupled to the communications module 602. The PUSCH processing module 606 is configured to process the PUSCH received by the communications module 602. For example, the PUSCH processing module 606 is configured to decode the PUSCH received by the communications module 602.

The apparatus 600 may further include a PDSCH generation module 608, and the PDSCH generation module 608 is coupled to the communications module 602. The PDSCH generation module 608 is configured to generate the PDSCH.

Figure 7:
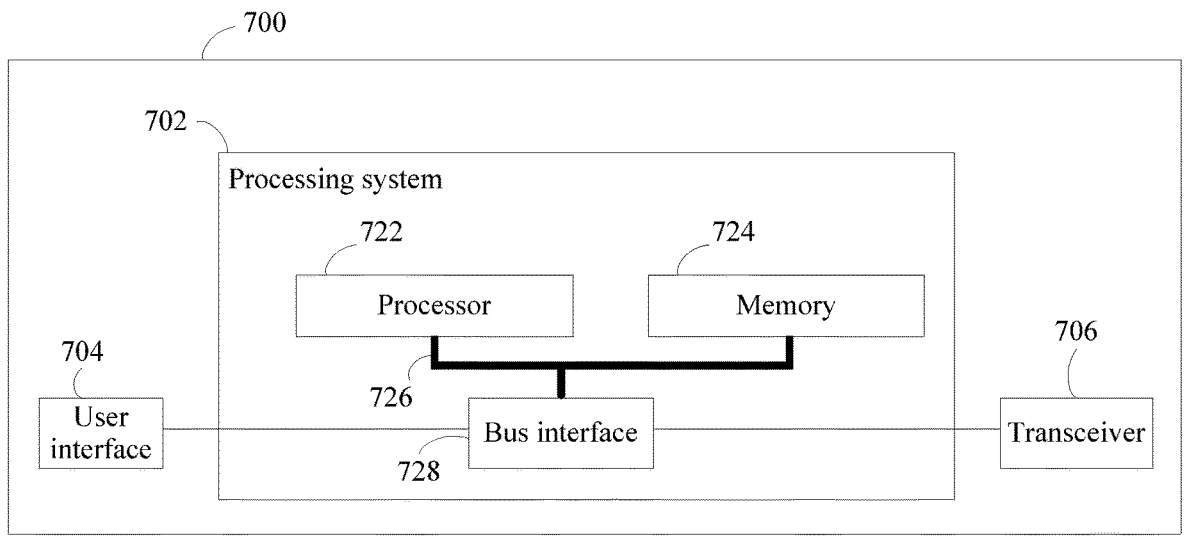
FIG. 7 is a schematic structural diagram of an apparatus according to an embodiment of this application.

FIG. 7 is a schematic structural diagram of an apparatus 700 according to an embodiment of this application. The apparatus 700 may be UE, and is capable of implementing the function of the UE in the method provided in the embodiments of this application. The apparatus 700 may alternatively be an apparatus that is capable of supporting the UE in implementing the function of the UE in the method provided in the embodiments of this application.

As shown in FIG. 7, the apparatus 700 includes a processing system 702, configured to implement or support the UE in implementing the function of the UE in the method provided in the embodiments of this application. The processing system 702 may be a circuit, and the circuit may be implemented by a chip system. The processing system 702 includes one or more processors 722 that may be configured to implement or support the UE in implementing the function of the UE in the method provided in the embodiments of this application. When the processing system 702 includes another apparatus in addition to the processor 722, the processor 722 may further be configured to manage the another apparatus included in the processing system 702. For example, the another apparatus may be one or more of the following memory 724, bus 726, and bus interface 728.

In this embodiment of this application, the processor may be a central processing unit (CPU), a general purpose processor, a network processor (NP), a digital signal processor (DSP), a microprocessor, a microcontroller, a programmable logic device (PLD), or any combination thereof. The processor may alternatively be any other apparatus having a processing function, for example, a circuit, a component, or a software module.

The processing system 702 may further include one or more memories 724, configured to store a program instruction and/or data. Further, the memory 724 may further be included in the processor 722. If the processing system 702 includes the memory 724, the processor 722 may be coupled to the memory 724. The processor 722 may cooperate with the memory 724 in performing an operation. The processor 722 may execute the program instruction stored in the memory 724. When executing the program instruction stored in the memory 724, the processor 722 can implement or support the UE in implementing the function of the UE in the method provided in the embodiments of this application. The processor 722 may further read the data stored in the memory 724. The memory 724 may further store data that is obtained when the processor 722 executes the program instruction.

In this embodiment of this application, the memory includes a volatile memory, for example, a random-access memory (RAM). The memory may alternatively include a non-volatile memory, for example, a flash memory, a hard disk drive (HDD), or a solid-state drive (SSD). The memory may alternatively include a combination of the foregoing types of memories. The memory may alternatively include any other apparatus having a storage function, for example, a circuit, a component, or a software module.

When the processor 722 implements or supports the UE in implementing the method provided in the embodiments of this application, the processor 722 may receive and process first DCI, and the processor 722 may further receive and process at least one of the following: second DCI, third DCI, and a PDSCH. The processor 722 may further generate and send a PUSCH.

The processing system 702 may further include the bus interface 728, configured to provide an interface between the bus 726 and another apparatus.

The apparatus 700 may further include a transceiver 706, configured to communicate with another communications device through a transmission medium, so that another apparatus in the apparatus 700 can communicate with the another communications device. The another apparatus may be the processing system 702. For example, the another apparatus in the apparatus 700 may communicate with the another communications device by using the transceiver 706, and receive and/or send corresponding information. It may also be described as: The another apparatus in the apparatus 700 may receive corresponding information, where the corresponding information is received by the transceiver 706 through the transmission medium, and the corresponding information may be exchanged between the transceiver 706 and the another apparatus in the apparatus 700 through the bus interface 728 or through the bus interface 728 and the bus 726; and/or the another apparatus in the apparatus 700 may send corresponding information, where the corresponding information is sent by the transceiver 706 through the transmission medium, and the corresponding information may be exchanged between the transceiver 706 and the another apparatus in the apparatus 700 through the bus interface 728 or through the bus interface 728 and the bus 726.

The apparatus 700 may further include a user interface 704. The user interface 704 is an interface between a user and the apparatus 700, and may be used for information exchange between the user and the apparatus 700. For example, the user interface 704 may be at least one of a keyboard, a mouse, a display, a speaker, a microphone, and a joystick.

The foregoing describes, from a perspective of the apparatus 700, an apparatus structure provided in this embodiment of this application. In the apparatus, the processing system 702 includes the processor 722, and may further include one or more of the memory 724, the bus 726, and the bus interface 728, to implement the method provided in the embodiments of this application. The processing system 702 also falls within the protection scope of this application.

Figure 8:
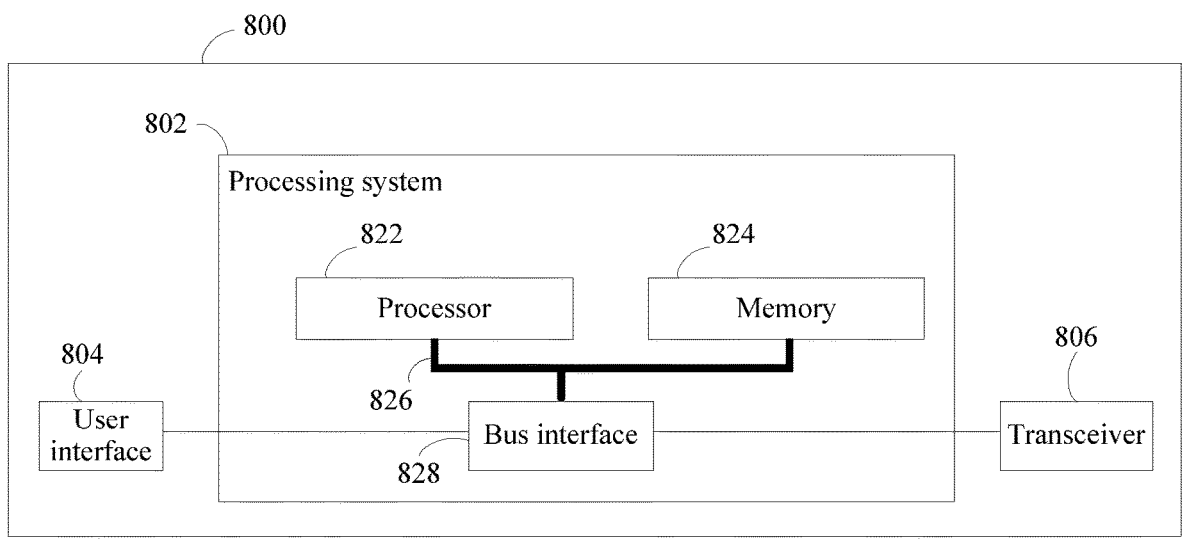
FIG. 8 is a schematic structural diagram of an apparatus according to an embodiment of this application

FIG. 8 is a schematic structural diagram of an apparatus 800 according to an embodiment of this application. The apparatus 800 may be a base station, and is capable of implementing the function of the base station in the method provided in the embodiments of this application. The apparatus 800 may alternatively be an apparatus that is capable of supporting the base station in implementing the function of the base station in the method provided in the embodiments of this application.

As shown in FIG. 8, the apparatus 800 includes a processing system 802, configured to implement or support the base station in implementing the function of the base station in the method provided in the embodiments of this application. The processing system 802 may be a circuit, and the circuit may be implemented by a chip system. The processing system 802 includes one or more processors 822 that may be configured to implement or support the base station in implementing the function of the base station in the method provided in the embodiments of this application. When the processing system 802 includes another apparatus in addition to the processor 822, the processor 822 may further be configured to manage the another apparatus included in the processing system 802. For example, the another apparatus may be one or more of the following memory 824, bus 826, and bus interface 828.

The processing system 802 may further include one or more memories 824, configured to store a program instruction and/or data. Further, the memory 824 may further be included in the processor 822. If the processing system 802 includes the memory 824, the processor 822 may be coupled to the memory 824. The processor 822 may cooperate with the memory 824 in performing an operation. The processor 822 may execute the program instruction stored in the memory 824. When executing the program instruction stored in the memory 824, the processor 822 can implement or support the base station in implementing the function of the base station in the method provided in the embodiments of this application. The processor 822 may further read the data stored in the memory 824. The memory 824 may further store data that is obtained when the processor 822 executes the program instruction.

When the processor 822 implements or supports the base station in implementing the method provided in the embodiments of this application, the processor 822 may generate and send first DCI, and the processor 822 may further generate and send at least one of the following: second DCI, third DCI, and a PDSCH. The processor 822 may further receive and process a PUSCH.

The processing system 802 may further include the bus interface 828, configured to provide an interface between the bus 826 and another apparatus.

The apparatus 800 may further include a transceiver 806, configured to communicate with another communications device through a transmission medium, so that another apparatus in the apparatus 800 can communicate with the another communications device. The another apparatus may be the processing system 802. For example, the another apparatus in the apparatus 800 may communicate with the another communications device by using the transceiver 806, and receive and/or send corresponding information. It may also be described as: The another apparatus in the apparatus 800 may receive corresponding information, where the corresponding information is received by the transceiver 806 through the transmission medium, and the corresponding information may be exchanged between the transceiver 806 and the another apparatus in the apparatus 800 through the bus interface 828 or through the bus interface 828 and the bus 826; and/or the another apparatus in the apparatus 800 may send corresponding information, where the corresponding information is sent by the transceiver 806 through the transmission medium, and the corresponding information may be exchanged between the transceiver 806 and the another apparatus in the apparatus 800 through the bus interface 828 or through the bus interface 828 and the bus 826.

The apparatus 800 may further include a user interface 804. The user interface 804 is an interface between a user and the apparatus 800, and may be used for information exchange between the user and the apparatus 800. For example, the user interface 804 may be at least one of a keyboard, a mouse, a display, a speaker, a microphone, and a joystick.

The foregoing describes, from a perspective of the apparatus 800, an apparatus structure provided in this embodiment of this application. In the apparatus, the processing system 802 includes the processor 822, and may further include one or more of the memory 824, the bus 826, and the bus interface 828, to implement the method provided in the embodiments of this application. The processing system 802 also falls within the protection scope of this application.

In the apparatus embodiments of this application, module division of an apparatus is logical function division and may be other division in actual implementation. For example, all function modules of the apparatus may be integrated into one module, or may be separated from each other, or at least two function modules may be integrated into one module.

All or some of the foregoing methods in the embodiments of this application may be implemented by using software, hardware, firmware, or any combination thereof. When software is used for implementation, the methods may be implemented completely or partially in a form of a computer program product. The computer program product includes one or more computer instructions. When the computer program instruction is loaded and executed on a computer, the procedures or functions according to the embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The embodiments are merely intended to describe the technical solutions of this application, but are not intended to limit the protection scope of the technical solutions of this application. Modification, equivalent replacement, or improvement made without departing from the basis of the technical solutions of this application shall fall within the protection scope of this application.

In the embodiments of this application, on the premise that there is no logic contradiction, the embodiments can be referenced from each other. For example, methods and/or terms in the method embodiments can be referenced from each other, functions and/or terms in the apparatus embodiments can be referenced from each other, and functions and/or terms in the apparatus embodiments and the method embodiments can be referenced from each other.

What is claimed is:

1. A method, comprising:
receiving, by a device, first downlink control information (DCI) through a first bandwidth part (BWP), wherein the first DCI comprises a BWP indication and a first frequency domain resource allocation indication, and a second BWP is indicated by the BWP indication; and
in response to a first resource allocation type and a second resource allocation type being configured for the second BWP, and in response to a size of an information field of the first frequency domain resource allocation indication being less than a size of an information field of a second frequency domain resource allocation indication, indicating, by the first frequency domain resource allocation indication, a frequency domain resource in the second BWP through the first resource allocation type, and the second frequency domain resource allocation indication is receivable in the second BWP to indicate the frequency domain resource in the second BWP.

2. The method according to claim 1, further comprising determining the frequency domain resource in the second BWP according to the first frequency domain resource allocation indication through the first resource allocation type.

3. The method according to claim 1, wherein:
the first frequency domain resource allocation indication comprises N bits, and the N bits respectively correspond to resource block groups (RBG) 0 to RBG (N—1) in the second BWP, wherein N is an integer greater than or equal to 1; and
for each of the N bits, when a value of a respective bit of the N bits is 1, the frequency domain resource in the second BWP comprises a RBG corresponding to the respective bit; or when a value of the respective bit is not 1, the frequency domain resource in the second BWP does not comprise a RBG corresponding to the respective bit.

4. The method according to claim 3, wherein N is equal to a quantity of RBGs comprised in the second BWP.

5. The method according to claim 1, wherein second DCI comprises the second frequency domain resource allocation indication, and the second DCI is received in the second BWP.

6. A method, comprising:
sending first downlink control information (DCI) through a first bandwidth part (BWP), wherein the first DCI comprises a BWP indication and a first frequency domain resource allocation indication, and a second BWP is indicated by the BWP indication; and
in response to a first resource allocation type and a second resource allocation type being configured for the second BWP, and in response to a size of an information field of the first frequency domain resource allocation indication being less than a size of an information field of a second frequency domain resource allocation indication, indicating, by the first frequency domain resource allocation indication, a frequency domain resource in the second BWP through the first resource allocation type, and the second frequency domain resource allocation indication is transmittable in the second BWP to indicate the frequency domain resource in the second BWP.

7. The method according to claim 6, wherein:
the first frequency domain resource allocation indication comprises N bits, and the N bits respectively correspond to resource block groups (RBG) 0 to RBG (N—1) in the second BWP, wherein N is an integer greater than or equal to 1; and
for each of the N bits, when a value of a respective bit of the N bits is 1, the frequency domain resource in the second BWP comprises a RBG corresponding to the respective bit, or when a value of the respective bit is not 1, the frequency domain resource in the second BWP does not comprise a RBG corresponding to the respective bit.

8. The method according to claim 7, wherein N is equal to a quantity of RBGs comprised in the second BWP.

9. The method according to claim 6, wherein second DCI comprises the second frequency domain resource allocation indication, and the second DCI is transmitted in the second BWP.

10. An apparatus, comprising:
a non-transitory memory; and
a processor coupled to the non-transitory memory, wherein processor is configured to:
  receive first downlink control information (DCI) through a first bandwidth part (BWP), wherein the first DCI comprises a BWP indication and a first frequency domain resource allocation indication, and a second BWP is indicated by the BWP indication; and
  in response to a first resource allocation type and a second resource allocation type being configured for the second BWP, and in response to a size of an information field of the first frequency domain resource allocation indication being less than size of an information field of a second frequency domain resource allocation indication, indicate, by the first frequency domain resource allocation indication, a frequency domain resource in the second BWP through the first resource allocation type, and the second frequency domain resource allocation indication receivable in the second BWP to indicate the frequency domain resource in the second BWP.

11. The apparatus according to claim 10, wherein the processor is further configured to determine the frequency domain resource in the second BWP according to the first frequency domain resource allocation indication through the first resource allocation type.

12. The apparatus according to claim 10, wherein:
the first frequency domain resource allocation indication comprises N bits, and the N bits respectively correspond to resource block groups (RBG) 0 to RBG (N–1) in the second BWP, wherein N is an integer greater than or equal to 1; and
for each of the N bits, when a value of a respective bit of the N bits is 1, the frequency domain resource in the second BWP comprises a RBG corresponding to the respective bit, or when a value of the respective bit is not 1, the frequency domain resource in the second BWP does not comprise a RBG corresponding to the respective bit.

13. The apparatus according to claim 12, wherein N is equal to a quantity of RBGs comprised in the second BWP.

14. The apparatus according to claim 10, wherein second DCI comprises the second frequency domain resource allocation indication, and the second DCI is received in the second BWP.

15. The apparatus according to claim 10, further comprising a transceiver, and the transceiver is used by the apparatus to communicate with a network device.

16. An apparatus, comprising:
a non-transitory memory; and
a processor coupled to the non-transitory memory, wherein the processor is configured to:
  send first downlink control information (DCI) through a first bandwidth part (BWP), wherein the first DCI comprises a BWP indication and a first frequency domain resource allocation indication, and a second BWP is indicated by the BWP indication; and
  in response to a first resource allocation type and a second resource allocation type being configured for the second BWP, and in response to a size of an information field of the first frequency domain resource allocation indication being less than a size of an information field of a second frequency domain resource allocation indication, indicating, by the first frequency domain resource allocation indication, a frequency domain resource in the second BWP through the first resource allocation type, and the second frequency domain resource allocation indication is transmittable in the second BWP to indicate the frequency domain resource in the second BWP.

17. The apparatus according to claim 16, wherein:
the first frequency domain resource allocation indication comprises N bits, and the N bits respectively correspond to resource block groups (RBG) 0 to RBG (N–1) in the second BWP, wherein N is an integer greater than or equal to 1; and
for each of the N bits, when a value of a respective bit of the N bits is 1, the frequency domain resource in the second BWP comprises a RBG corresponding to the respective bit, or when a value of the respective bit is not 1, the frequency domain resource in the second BWP does not comprise a RBG corresponding to the respective bit.

18. The apparatus according to claim 16, wherein N is equal to a quantity of RBGs comprised in the second BWP.

19. The apparatus according to claim 16, wherein second DCI comprises the second frequency domain resource allocation indication, and the second DCI is transmitted in the second BWP.

* * * * *

UNITED STATES PATENT AND TRADEMARK OFFICE
CERTIFICATE OF CORRECTION

PATENT NO. : 11,445,536 B2
APPLICATION NO. : 16/890006
DATED : September 13, 2022
INVENTOR(S) : Junchao Li et al.

It is certified that error appears in the above-identified patent and that said Letters Patent is hereby corrected as shown below:

In the Specification

Column 59, Line 22; delete "505" and insert --504--.

Signed and Sealed this
Ninth Day of May, 2023

Katherine Kelly Vidal
*Director of the United States Patent and Trademark Office*